United States Patent [19]

Yonekawa et al.

[11] Patent Number: 5,071,158
[45] Date of Patent: Dec. 10, 1991

[54] FLUID PRESSURE TYPE ACTIVE SUSPENSION RESPONSIVE TO CHANGE OF RATE OF CHANGE OF VEHICLE HEIGHT OR CHANGE OF ACCELERATION OF VEHICLE BODY

[75] Inventors: Takashi Yonekawa, Mishima; Shuuichi Buma; Toshio Aburaya, both of Toyota; Kunihito Sato, Susono; Masaki Kawanishi, Toyota; Kouichi Kokubo, Nagoya; Takami Sugiyama, Hazu; Toshiaki Hamada, Toyota, all of Japan

[73] Assignees: Toyota Jidosha Kabushiki Kaisha; Aisin Seiki Kabushiki Kaisha, both of Aichi, Japan

[21] Appl. No.: 568,161

[22] Filed: Aug. 16, 1990

[30] Foreign Application Priority Data

Aug. 28, 1989 [JP] Japan .................................. 1-221133
Aug. 31, 1989 [JP] Japan .................................. 1-224866

[51] Int. Cl.$^5$ ............................................. B60G 11/26
[52] U.S. Cl. ...................................... 280/707; 280/714; 364/424.05
[58] Field of Search ......... 280/707, 711, 714, DIG. 1, 280/804, 6.1; 188/299; 364/424.05

[56] References Cited

U.S. PATENT DOCUMENTS

| | | | |
|---|---|---|---|
| 4,647,069 | 3/1987 | Iijima | 280/707 |
| 4,717,173 | 1/1988 | Sugasawa et al. | 280/707 |
| 4,789,935 | 12/1988 | Buma et al. | 364/424.05 |
| 4,803,630 | 2/1989 | Takizawa et al. | 364/424.05 |
| 4,853,860 | 8/1989 | Achenbach | 364/424.05 |
| 4,924,393 | 5/1990 | Kurosawa | 280/707 |
| 4,936,604 | 6/1990 | Kawagoe et al. | 280/707 |
| 4,979,115 | 12/1990 | Takahashi | 364/424.05 |
| 4,999,777 | 12/1991 | Schussler et al. | 364/424.05 |

FOREIGN PATENT DOCUMENTS

| | | |
|---|---|---|
| 0114757 | 8/1984 | European Pat. Off. . |
| 3408292A1 | 8/1985 | Fed. Rep. of Germany . |
| 60-500662 | 5/1985 | Japan . |
| 61-218414 | 9/1986 | Japan . |
| 62-198509 | 9/1987 | Japan . |
| 63-106133 | 5/1988 | Japan . |
| 63-106127 | 6/1988 | Japan . |
| 63-227411 | 9/1988 | Japan . |
| 1-197109 | 8/1989 | Japan . |
| 2-38122 | 2/1990 | Japan . |
| 2-155814 | 6/1990 | Japan . |
| 2-155819 | 6/1990 | Japan . |
| 2-175405 | 7/1990 | Japan . |
| 3-31013 | 2/1991 | Japan . |

Primary Examiner—Kenneth R. Rice
Attorney, Agent, or Firm—Oliff & Berridge

[57] ABSTRACT

In a fluid pressure type active suspension in a vehicle such as an automobile in which a fluid pressure type actuator supporting a vehicle body from a wheel so as to be able to vary a vehicle height of the vehicle body relative to the wheel in accordance with a fluid pressure supplied in its fluid chamber is operated by a pressure control means which controls the fluid pressure supplied in the fluid chamber of the actuator according to certain control parameters including at least a rate of change of the vehicle height or an acceleration of the vehicle body, the control means is adapted to modify an actual value of the rate of change of the vehicle height or the acceleration of the vehicle body for use in the control of the fluid pressure to be less than the actual value thereof when the rate of change of the vehicle height or the acceleration of the vehicle body is greater than a threshold value therefor.

8 Claims, 21 Drawing Sheets

FLUID PRESSURE TYPE ACTIVE SUSPENSION RESPONSIVE TO CHANGE OF RATE OF CHANGE OF VEHICLE HEIGHT OR CHANGE OF ACCELERATION OF VEHICLE BODY

BACKGROUND OF THE INVENTION

1. Field of the Invention

The present invention relates to an active suspension in a vehicle such as an automobile, and more particularly to a fluid pressure type active suspension.

2. Description of the Prior Art

As shown in, for example, Japanese Publication 60-500662, it is known to incorporate in a vehicle such as an automobile an active suspension which comprises a fluid pressure type actuator provided between a vehicle body and a wheel, and a pressure control means for controlling the fluid pressure in said actuator, wherein the control of the pressure in said actuator refers as one of the control parameters to the rate of change of the vehicle height at a portion of the vehicle body corresponding to said wheel.

By such a fluid pressure type active suspension it is possible to more effectively control a transitional change of the posture of the vehicle body as compared with a similar suspension in which the rate of change of the vehicle height is not included in the control parameters.

However, since the rate of change of the vehicle height increases greatly when the vehicle runs on a rough road, the operation of the active suspension of the above-mentioned type reflecting the rate of change of the vehicle height in its control becomes excessive, and as a result a shock is apt to occur in the vehicle body, thereby affecting the comfortableness of the vehicle.

Particularly when the rate of change of the vehicle height fluctuates at a high frequency and/or a large amplitude, the fluid pressure in the actuator can not sufficiently follow the control output of the control means due to a delay in the response of the control system, and as a result a high vibration is apt to occur in the suspension and/or a noise would be generated due to a delay in the operational phase of the suspension, causing an increase of consumption of the working fluid.

Further, as shown in, for example, Japanese Publication 63-227411, it is also known to operate a similar active suspension in a manner that the fluid pressure in the actuator is controlled by using an acceleration of the vehicle body as one of the control parameters so that a transient change of the posture of the vehicle body is more effectively suppressed.

However, in such an active suspension, since the rate of change of the acceleration of the vehicle body increases greatly when the vehicle is turning or accelerated or decelerated on a rough road, the posture of the vehicle body is apt to become unstable, thereby also affecting the comfortableness of the vehicle. Further, when the vehicle body touches or bumps against a foreign body while it is running. the acceleration of the vehicle body is amplified, and therefore, a shock is apt to occur in the vehicle body or the posture of the vehicle body is apt to be abruptly changed.

SUMMARY OF THE INVENTION

In view of the above-mentioned problems in the fluid pressure type active suspension in which the rate of change of the vehicle height or an acceleration of the vehicle body is referred to as one of the control parameters, it is the object of the present invention to provide an improved fluid pressure type active suspension which is responsive to the rate of change of the vehicle height and/or an acceleration of the vehicle body and is still free from the above-mentioned problems.

According to the present invention the above-mentioned object is accomplished by a fluid pressure type active suspension in a vehicle such as an automobile, comprising a fluid pressure type actuator having a fluid chamber and supporting a vehicle body from a wheel so as to be able to vary a vehicle height of said body relative to said wheel in accordance with a fluid pressure supplied in said fluid chamber, and a pressure control means for controlling the fluid pressure supplied in said fluid chamber of said actuator according to certain control parameters including at least a rate of change of the vehicle height or an acceleration of the vehicle body, wherein said control means is adapted to modify an actuator value of said rate of change of the vehicle height or said acceleration of the vehicle body for use in the control of said fluid pressure supplied in said fluid chamber of said actuator to be less than the actual value thereof when said rate of change of the vehicle height or said acceleration of the vehicle body is greater than a threshold value therefor.

By the value of the rate of change of the vehicle height or the value of the acceleration of the vehicle body for use in the control of the fluid pressure in the fluid chamber of the actuator being modified to be less than the actual value thereof when the actual value thereof increases beyond a threshold value, it is avoided that the fluid pressure in the actuator is so rapidly changed according to such a large actual value of said rate of change of the vehicle height or said acceleration of the vehicle body, and therefore it is avoided that the posture of the vehicle body gets unstable or an uncomfortable shock occurs in the vehicle body due to a rapid change of the fluid pressure in the actuator.

The value for use in the suspension control of said rate of change of the vehicle height may be modified only to limit is maximum value, or may be modified to remain substantially zero when the actual value thereof is very small, then to be increased substantially proportionally along with increase of the actual value thereof until the actual value thereof reaches a certain threshold value therefor, and then to remain substantially constant when the actual value thereof further increases while the vehicle is substantially stopped.

The value for use in the suspension control of said rate of change of the vehicle height may be modified to remain substantially zero when the actual value thereof is very small, then to be increased substantially proportionally along with increase of the actual value thereof until the actual value thereof reaches a certain threshold value therefor, and then to be decreased along with further increase of the actual value thereof beyond said threshold value while the vehicle is running.

The value for use in the suspension control of said rate of change of the vehicle height may be modified to remain substantially zero when the actual value thereof is very small, then to be increased substantially proportionally along with increase of the actual value thereof until the actual value thereof reaches a certain threshold value therefor, then to be decreased so far as to be opposite to the actual value thereof in sign along with further increase of the actual value thereof beyond said threshold value until the actual value thereof reaches a certain higher further threshold value therefor, and then to be again increased to substantially proportional to any further increase of the actual value thereof beyond said further threshold value while the vehicle is running on a rough road.

The value for use in the suspension control of said acceleration of the vehicle body may be modified to remain substantially zero when the actual value thereof is very small, then to be increased substantially proportionally to an along with increase of the actual value thereof until the actual value thereof reaches a certain threshold value therefor, and then to remain substantially constant when the actual value thereof further increases beyond said threshold value.

Said substantially constant value may be greater when the vehicle is running on a rough road than when the vehicle is stopped.

Said substantially constant value may be greater when the vehicle is running on a relatively smooth road then when the vehicle is running on a rough road.

BRIEF DESCRIPTION OF THE DRAWINGS

In the accompanying drawings.

DESCRIPTION OF THE PREFERRED EMBODIMENTS

In the following the invention will be described with respect to some preferred embodiments thereof with reference to the accompanying drawings.

Figure 1:
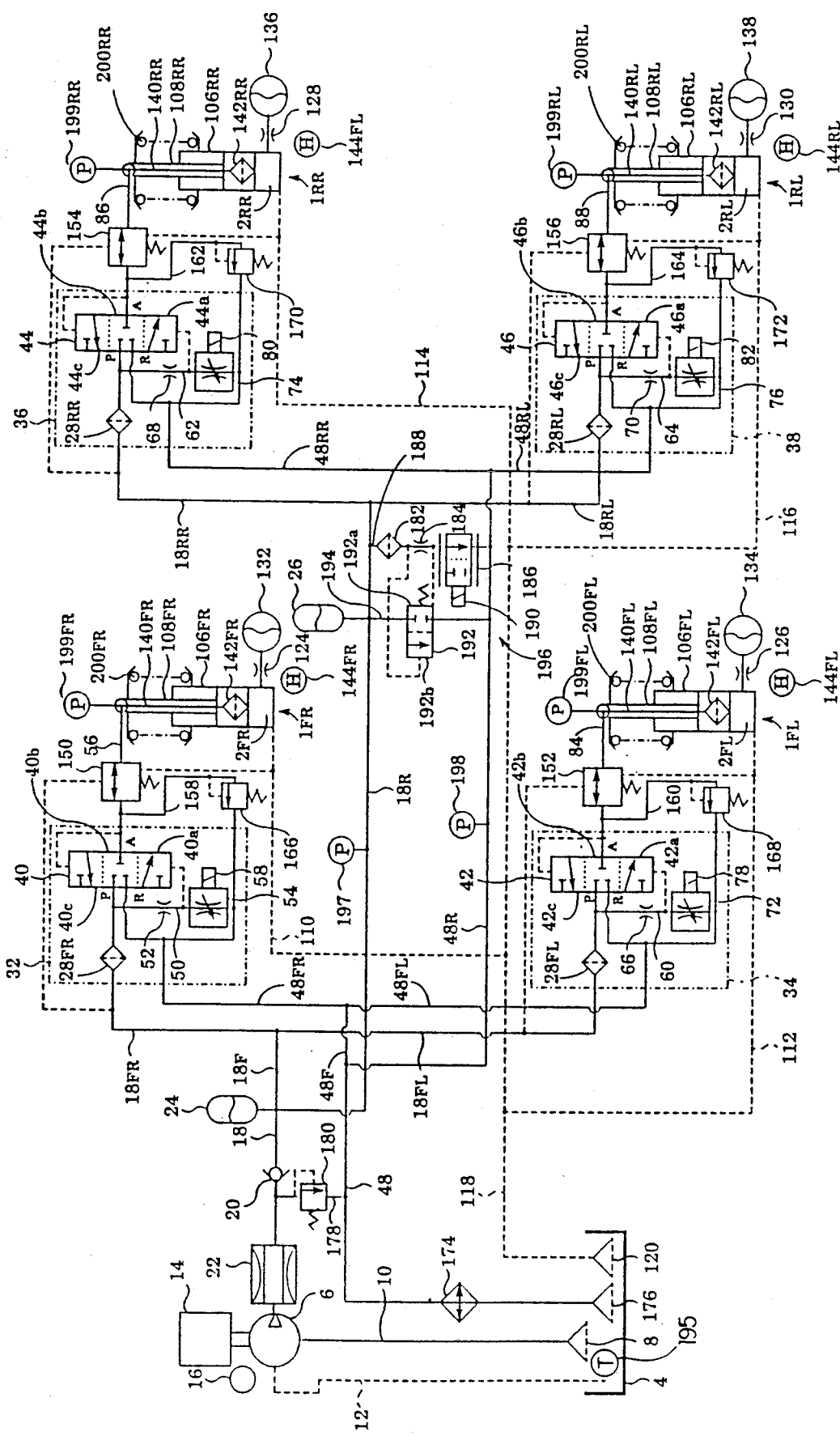
FIG. 1 is a diagrammatic illustration of the fluid pressure circuits of an embodiment of the fluid pressure type active suspension system according to the present invention.

Referring to FIG. 1 showing diagrammatically the fluid circuits of an embodiment of the fluid pressure type active suspension system according to the present invention, the suspension system includes actuators 1FR, 1FL, 1RR and 1RL provided for front right, front left, rear right and rear left vehicle wheels, not shown, respectively. These actuators have therein working fluid chambers 2FR, 2FL, 2RR, and 2RL, respectively.

In this figure, 4 designates a reserve tank which contains oil serving as the working fluid, and the tank 4 is connected to the suction side of a pump 6 by a suction line 10 having therein a filter 8 for removing foreign materials from the oil. To the pump 6 is connected with a drain line 12 which collects the oil leaked in the pump and returns it to the reserve tank 4. The pump 6 is drivingly connected with and rotationally driven by an engine 14, the rotational speed of which is detected by a rotational speed sensor 16.

A high pressure line 18 is connected with the discharge side of the pump 6. A check valve 20 is incorporated in the high pressure line 18 so as to permit only the flow of oil in the direction from the pump toward the actuators, and between the pump 6 and the check valve 20 is provided an attenuator 22 which serves to absorb or dampen the pressure pulsation of the oil discharged from the pump, thereby reducing the pressure variation. The high pressure line 18 is connected with one end each of a high pressure line 18F for the front vehicle wheels and a high pressure line 18R for the rear vehicle wheels, with which are connected accumulators 24 and 26, respectively. These accumulators contain therein pressurized gas and serve to absorb pressure variation of the oil and to accumulate pressure. A high pressure line 18FR for the front right vehicle wheel and a high pressure line 18FL for the front left vehicle wheel are each connected at one end thereof with the high pressure line 18F, while a high pressure line 18RR for the rear right vehicle wheel and a high pressure line 18RL for the rear left vehicle wheel are each connected at one end thereof with the high pressure line 18R. The high pressure lines 18FR, 18FL, 18RR and 18RL have therein filters 28FR, 28FL, 28RR and 28RL, respectively, and are connected at their other ends with ports P of pilot-operated three-port switching control valves 40, 42, 44 and 46 included in pressure control means 32, 34, 36 and 38, respectively.

The pressure control means 32 comprises the switching control valve 40, a line 50 for connecting the high pressure line 18FR with a low pressure line 48FR for the front right vehicle wheel, a fixed throttle means 52 and a variable throttle means 54 both provided in the line 50. The switching control valve 40 has, in addition to the port P, ports R and A connected with a low pressure line 48FR and a connection line 56, respectively. The switching control valve 40 may be a spool type valve adapted to be switched over by a pilot pressure Pp taken from the line 50 at a portion between the throttle means 52 and 54 and a pressure Pa taken from the connection line 56 to a switching position 40a where it communicates the port P with the port A when the pressure Pp is substantially higher than the pressure Pa; a switching position 40b where it interrupts communication among all the ports when the pressure Pp is substantially equal to Pa; and a shifting position 40c where it communicates the port R with the port A when the pressure Pp is substantially lower than the pressure Pa. The variable throttle means 54 is adapted to vary its effective flow area by the electric current supplied to its solenoid 58 being controlled and to cooperate with the fixed throttle means 52 to variably control the pilot pressure Pp.

Similarly, the pressure control means 34, 36 and 38 comprise pilot-operated, three-port switching control valves 42, 44 and 46 corresponding to the valve 40, lines 60, 62 and 64 corresponding to the line 50, fixed throttle means 66, 68 and 70 corresponding to the throttle means 52, and variable throttle means 72, 74 and 76 corresponding to the variable throttle means 54, respectively. The variable throttle means 72, 74 and 76 have solenoids 78, 80 and 82, respectively, corresponding to the solenoid 58.

The switching control valves 42, 44 and 46 have the same construction as the switching valve 40, and have the ports R connected with one end of a low pressure line 48FL for the front left vehicle wheel, a low pressure line 48RR for the rear right vehicle wheel, and a low pressure line 48RL for the rear left vehicle wheel, respectively, and the ports A connected with one end of connection lines 84, 86 and 88, respectively. The witching control valves 42, 44 and 46 are spool type valves adapted to take in as pilot pressures therefor the pressures Pp in the associated lines 60, 62 and 64 between the associated fixed and the variable throttling means and the pressures Pa in the associated lines 84, 86 and 88, and to be shifted to switching positions 42a, 44a and 46a, respectively, where they communicate the ports P with the ports A when the pressures Pp are substantially higher than the pressures Pa; shifting positions 42b, 44b and 46b where they interrupt communications among all the ports when the pressures Pp are substantially equal to the pressures Pa; and shifting positions 42c, 44c and 46c where they communicate the ports R with the ports A when the pressure Pp are substantially lower than the pressures Pa.

As shown schematically in FIG. 1, the actuators 1FR, 1FL, 1RR and 1RL include cylinders 106FR, 106FL, 106RR and 106RL and pistons 108FR, 108FL, 108RR and 108RL reciprocably inserted into the associated cylinders, defining working fluid chambers 2FR, 2FL, 2RR and 2RL, respectively. While in the shown embodiment the actuators are located between a vehicle body, now shown, and associated suspension arms, also not shown, with each cylinder being coupled to the associated suspension arm and the upper end of the rod portion of each piston being coupled to the vehicle body, each cylinder may be coupled to the vehicle body while each piston may be coupled to the associated suspension arm. Drain lines 110, 112, 114 and 116 are connected at each one end with the cylinders 106FR, 106FL, 106RR and 106RL of the actuators, respectively. The other ends of the drain lines 110, 112, 114 and 116 are connected with a drain line 118 which in turn is connected with the reserve tank 4 by way of a filter 120 so that the oil leaked from the working fluid chambers may be returned to the tank.

Accumulators 132, 134, 136 and 138 are connected to the working fluid chambers 2FR, 2FL, 2RR and 2RL by way of throttle means 124, 126, 128 and 130, respectively, serving as hydropneumatic springs. The pistons 108FR, 108FL, 108RR and 108RL have therein passages 140FR, 140FL, 140RR and 140RL, respectively. These passages connect the associated lines 56, 84, 86 and 88 with the associated working fluid chambers 2FR, 2FL, 2RR and 2RL, respectively, and have therein filters 142FR, 142FL, 142RR and 142RL, respectively. Adjacent the actuators 1FR, 1FL, 1RR and 1RL are installed vehicle height sensors 144FR, 144FL, 144RR and 144RL, respectively, for detecting vehicle heights corresponding to the associated vehicle wheels.

The lines 56, 84, 86 and 88 have therein pilot-operated cut-off valves 150, 152, 154 and 156, respectively, which are in closed conditions whenever the pressure differences between the pressures in the high pressure lines 18FR, 18FL, 18RR and 18RL upstream of the associated pressure control valves 40, 42, 44 and 46, respectively, and the pressures in the drain lines 110, 112, 114 and 116, respectively, are not more than respective predetermined values. The lines 56, 84, 86 and 88 are, at portions thereof between the associated pressure control valves and the cut-off valves, connected with the line 50, 60, 62 and 64 on the downstream side of the associated variable throttle means by lines 158, 160, 162 and 164, respectively, which have therein relief valves 166, 168, 170 and 172, respectively, adapted to take in as pilot pressures therefor the pressures in the associated lines 158, 160, 162 and 164, respectively, on the upstream side thereof, and to open when the pilot pressures exceed respective predetermined values so as thereby to conduct a certain amount of oil in the connection lines to the lines 50, 60, 62 and 64, respectively.

The cut-off valves 150, 152, 154 and 156 may be adapted to remain closed whenever the differences between the pressures in the high pressure lines 18FR, 18FL, 18RR and 18RL and the atmospheric pressure are not more than respective predetermined values.

The lines 48FR and 48FL are connected at their other ends with one end of a low pressure line 48F for the front vehicle wheels, while the lines 48RR and 48RL are connected at their other ends with one end of a low pressure line 48R for the rear vehicle wheels. The lines 48F and 48R are connected at their other ends with one end of a low pressure line 48. The line 48 has therein an oil cooler 174 and is connected at the other end with the reserve tank 4 by way of a filter 176. The high pressure line 18 is, at a portion thereof between the check valve 20 and the attenuator 22, connected with the low pressure line 48 by a line 178. The line 178 has therein a relief valve 180 adapted to open when its pilot pressure is higher than a predetermined value.

The high pressure line 18R and the low pressure line 48R are connected with each other by a line 188 which has therein a filter 182, a throttle means 184 and a normally open type electromagnetic on-off valve 186 including a solenoid 190 for controlling the valve opening. The on-off valve 186 is adapted to open when its solenoid 190 is energized and to control the flow rate of the oil flowing therethrough according to control of the energizing electric current supplied thereto. The high pressure line 18R and the low pressure line 48R are further connected with each other by a line 194 having therein a pilot-operated on-off valve 192. The on-off valve 192 is adapted to take in as a pilot pressure therefor the pressures on opposite sides of the throttle means 184 and to remain in its closed position 192a when no substantial pressure difference exists between the pressures on opposite sides of the throttle means 184 and to be switched over to its open position 192b when the pressure difference across the throttle means 184 is higher than a predetermined value. Thus, the throttle means 184, the electromagnetic on-off valve 186 and the on-off valve 192 cooperate with each other to define a by-pass means 196 which selectively communicates the high pressure line 18R with the pressure flow line 48R while controlling the flow rate of the oil flowing from the high pressure line to the low pressure line.

Further in the shown embodiment, a pressure sensor 197 is connected to the high pressure line 18R for detecting the oil pressure Ps therein and similarly a pressure sensor 198 is connected to the low pressure line 48R for detecting the oil pressure Pd therein. Pressure sensors 199FR, 199RL, 199RR and 199RL are connected to the connection lines 56, 84, 86 and 88 for detecting the oil pressure in the working fluid chambers 2FR, 2RL, 2RR and 2RL, respectively. A temperature sensor 195 is provided in the reserve tank 4 for detecting the temperature T of the oil in the tank. Compression coil springs 200FR, 200FL, 200RR and 200RL serving as suspension springs are interposed between the upper seats attached to the rod portions of the pistons 108FR, 108FL, 108RR and 108RL incorporated in the actuators and the lower seats secured to the cylinders 106FR, 106FL, 106RR and 106RL, respectively.

Figure 2:
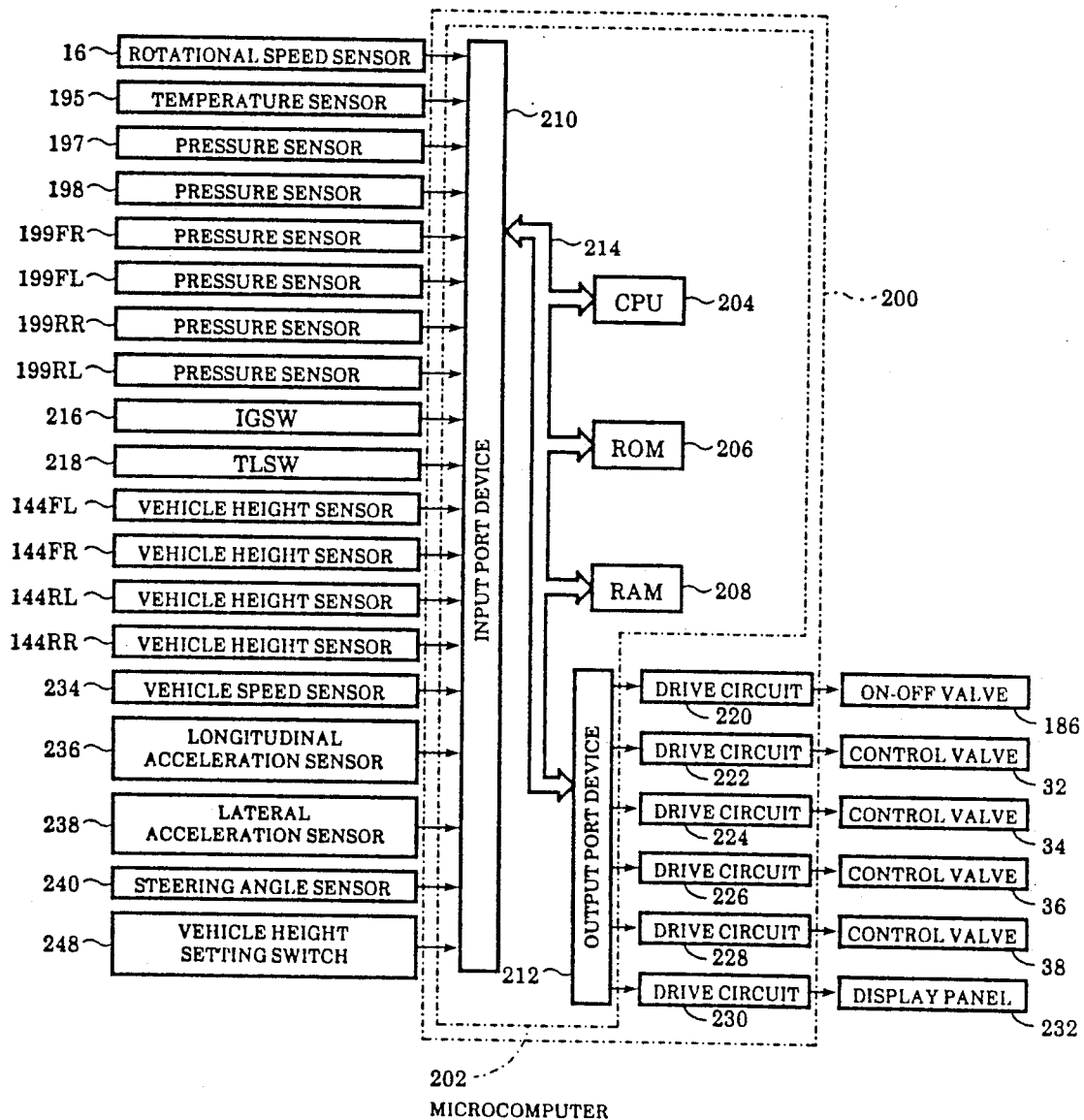
FIG. 2 is a block diagram showing an electric control device in the embodiment shown in FIG. 1.

The electromagnetic on-off valve 186 and the pressure control means 32, 34, 36 and 38 are controlled by an electric control device 200 shown in FIG. 2. The electric control device 200 includes a microcomputer 202. The microcomputer 202 may, as shown in FIG. 2, be of a conventional construction having a central processing unit (CPU) 204, a read only memory (ROM) 206, a random access memory (RAM) 208, an input port device 210, and an output port device 212, all of these interconnected with each other by a two way common bus 214.

The input port device 210 is supplied with a signal indicative of the rotational speed N of the engine 14 from the rotational speed sensor 16, a signal indicative of the temperature T of the oil from the temperature sensor 195, signals indicative of the pressures Ps and Pd within the high pressure and the low pressure lines from the pressure sensor 197 and 198, respectively, signals indicative of the pressures Pi (here "i" is "1" for the front left wheel, "2" for the front right wheel, "3" for the rear left wheel, and "4" for the rear right wheel) in the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, a signal indicative of whether or not the intake throttle valve of the engine (not shown) is opened from a throttle switch (TLSW) 218, and signals indicative of the vehicle heights Xi (i=1, 2, 3 and 4 corresponding to the front left wheel, the front right wheel, the rear left wheel, and the rear right wheel from the vehicle height sensors 144FL, 144FR, 144RL and 144RR, respectively.

Further, the input port device 210 is supplied with a signal indicative of a vehicle speed V from a vehicle speed sensor 234, a signal indicative of a longitudinal acceleration Ga from a longitudinal acceleration sensor 236, a signal indicative of a lateral acceleration Gl from a lateral acceleration sensor 238, a signal indicative of a steering angle from a steering angle sensor 240, and a signal indicative of whether the mode Hset for controlling the vehicle height set by a vehicle height setting switch 248 is a high mode Hh or a normal mode Hn. The switch 248 is provided in the cabin to be operated by a driver or a passenger according to his taste.

The input port device 210 processes the signals input thereto in a predetermined manner, and under the control of the CPU 204 which is based upon the program and stored in the ROM 206, outputs the processed signals to the CPU and the RAM 208. The ROM 206 stores the control flows shown in FIG. 3 and FIGS. 6A through 6C and the maps shown in FIGS. 4 and 5 and FIGS. 7 through 25. The output port device 212 outputs, under the control of the CPU 204, a control signal via drive circuit 220 to the electromagnetic on-off valve 186, control signals via drive circuits 222, 224, 226 and 228 to the pressure control means 32, 34, 36 and 38, or more exactly, to the solenoids 58, 78, 80 and 82 in the variable throttle means 54, 72, 74 and 76, respectively, and a control signal via a drive circuit 230 to a display panel 232.

Referring now to the flowchart shown in FIG. 3, the operation of the embodiment will be explained.

Figure 3:
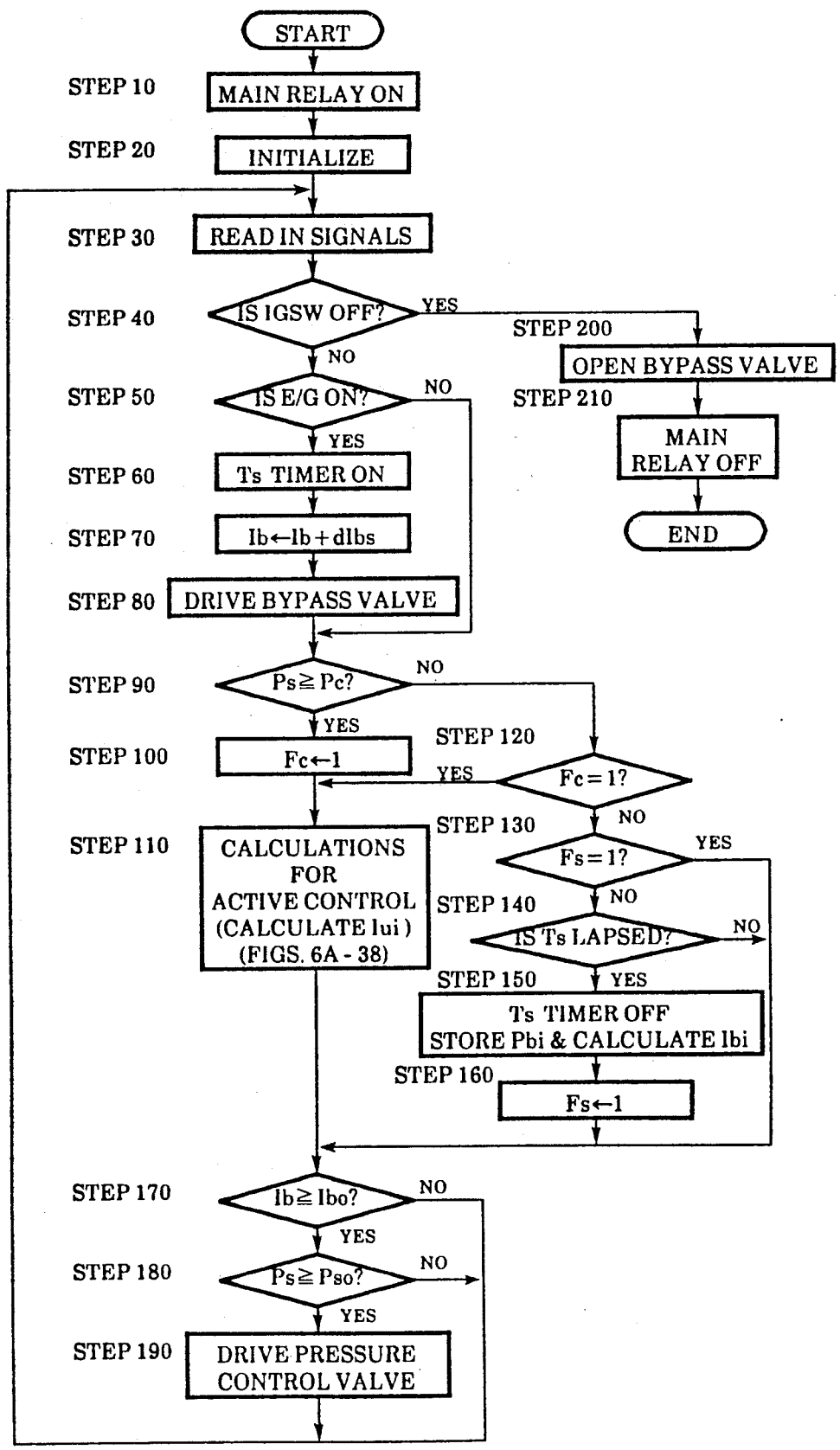
FIG. 3 is a flowchart showing a flow of control carried out by the electric control device shown in FIG. 2.

In this connection, it is to be noted that the routine of the control flow shown in FIG. 3 is initiated when the ignition switch 216 is turned on. It should also be noted that in the flowchart shown in FIG. 3, the flag Fc relates to whether or not the pressure Ps of the oil in the high pressure line has ever exceeded a threshold pressure Pc above which the cut-off valves 152, 150, 156 and 154 are completely opened Fc=1 means that the pressure Ps has at one time, exceeded the pressure. The flag Fs relates to whether or not standby pressures Pbi (i=1, 2, 3 and 4) referred to later have been set for the pressure control valves 34, 32, 38 and 36, with FS=1 meaning the standby pressures have been set.

In the first step 10, a main relay, not shown in the figures, is turned on, and then the flow of control proceeds to step 20.

In step 20, the RAM 208 is cleared of all the information stored therein and all the flags are reset to zero, and then the flow of control proceeds to step 30.

In step 30, data are read in with respect to the signal indicative of the rotational speed N of the engine 14 detected by the rotational speed sensor 16, the signal indicative of the temperature T of oil detected by the temperature sensor 195, signals indicative of the pressures Ps and Pd in the high pressure and the low pressure lines detected by the pressure sensors 197 and 198, respectively, the signals indicative of the pressures Pi in the working fluid chambers 2FL, 2FR, 2RL and 2RR detected by the pressure sensors 199FL, 199FR, 199RL and 199RR, the signal indicative of whether or not the ignition switch 216 is on, the signals indicative of the vehicle heights Xi detected by the vehicle height sensors 144FL, 144FR, 144RL and 144RR, the signal indicative of the vehicle speed V detected by the speed sensor 234, the signal indicative of the longitudinal acceleration Ga detected by the longitudinal acceleration sensor 236, the signal indicative of the lateral acceleration Gl detected by the lateral acceleration sensor 238, the signal indicative of the steering angle As detected by the steering angle sensor 240, and the signal indicative of whether the mode of controlling the vehicle height set by the vehicle height setting switch 248 is the high mode or the normal mode, and then the flow of control proceeds to step 40.

In step 40, it is judged if the ignition switch is off. If it is judged that the ignition switch is off, the flow of control proceeds to step 200, whereas if it is judged that the ignition switch is on, the flow of control proceeds to step 50.

In step 50, it is judged if the engine is running based upon whether or not the rotational speed N of the engine detected by the rotational speed sensor 16 and read in in step 30 is higher than a predetermined value. If it is judged that the engine is not running, the flow of control proceeds to step 90, whereas if it is judged that the engine is running, the flow of control proceeds to step 60.

It is to be understood that the judgement with regard to whether or not the engine is running may be made based upon by other parameters such as, for example, whether or not the voltage of the electricity generated by an alternator, not shown, driven by the engine is higher than a predetermined value.

In step 60, a timer is started to count the period of time Ts from the time point at which the engine is started to the time point at which the standby pressures Pbi are set for the pressure control means 34, 32, 38 and 36 in step 150 referred to later, and then the flow of control proceeds to step 70. If, however, the timer has already been started, it continues time counting.

Figure 4:
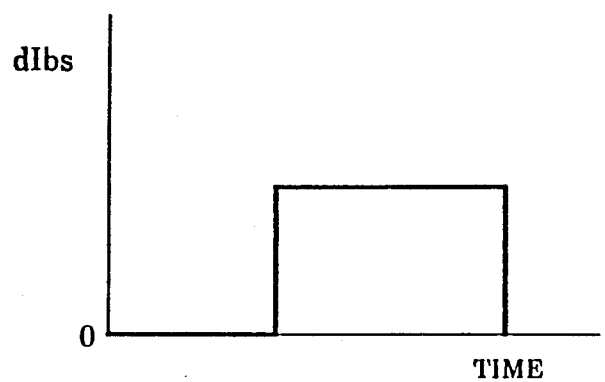
FIG. 4 is a graph showing a map used in calculating the electric current Ib to be supplied to the bypass control means when the active suspension system is being started.

In step 70, an electric current Ib to be supplied to the solenoid 190 in the electromagnetic on-off valve 186 in the bypass control means 196 is calculated according to a map such as the graph shown in FIG. 4 and the following equation and is stored in ROM 206:

$$Ib = Ib + dIbs$$

Then the flow of control proceeds to step 80. In step 80, the electric current Ib calculated in the step 70 is supplied to the solenoid 190 in the electromagnetic on-off valve 186 so as thereby to shift the bypass control means 196 to its fully closed condition, and then the flow of control proceeds to step 90.

In step 90, it is judged whether or not the pressure Ps in the high pressure line is equal to or higher than the threshold value Pc. If it is judged that Ps is not equal to or not higher than Pc, the flow of control proceeds to step 120, whereas if it is judged that Ps is equal to or higher than Pc, the flow of control proceeds to step 100.

In step 100, the flag Fc is set to "1", and then the flow of control proceeds to step 110.

In step 110, as will be described in detail later with reference to FIGS. 6A through 38, in order to control the comfortability of the vehicle and the attitude of the vehicle body, calculations for the active control are carried out based upon the data read in in step 30 so as to calculate the electric currents Iui to be supplied to the solenoids 78, 58, 82 and 80 incorporated in the variable throttle means 72, 54, 76 and 74 in the pressure control means, and then the flow of control proceeds to step 170.

In step 120, it is judged whether or not the flag Fc is "1". If it is judged that the flag Fc is "1", i.e., the pressure Ps of the oil in the high pressure line has lowered to a level lower than the threshold pressure Pc after it had once been increased to a level equal to or higher than the threshold value, the flow of control proceeds to step 110, whereas if it is judged that the flag Fc is not "1", i.e., the pressure Ps has not yet been increased to a level equal to or higher than the threshold pressure Pc, then the flow of control proceeds to step 130.

In step 130, it is judged whether or not the flag Fs is "1". If it is judged that the flag Fs is "1", the flow of control proceeds to step 170, whereas if it is judged that the flag Fs is not "1", the flow of control proceeds to step 140.

In step 140, it is judged whether or not the time Ts has elapsed. If it is judged that the time Ts has not yet elapsed, the flow of control proceeds to step 170, whereas if it is judged that the time Ts has elapsed, the flow of control proceeds to step 150.

Figure 5:
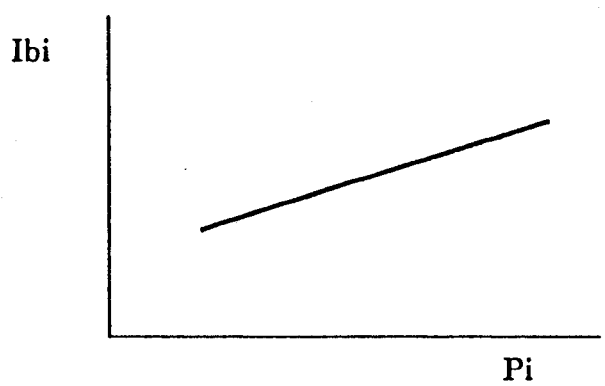
FIG. 5 is a graph showing a relationship between the pressures Pi in the working fluid chambers of the actuators and the electric currents Ibi supplied to the pressure control means.

In step 150, the Ts timer is stopped, and the pressures Pi read in in step 30 are stored in the RAM 208 as the standby pressures Pbi, and further the values of the electric currents Ibi(i=1, 2, 3 and 4) to be supplied to the solenoids 78, 58, 82 and 80 incorporated in the variable throttle means 72, 54, 76 and 74 in the pressure control means 34, 32, 38 and 36 are calculated based upon the map as shown in FIG. 5 stored in the ROM 206 so that the pressures in the connection lines 84, 56, 88 and 86 between the associated pressure control means and the associated cut-off valves are controlled to the respective standby pressures Pbi, i.e., the pressures which are substantially equal to the pressures Pi in the working fluid chambers 2FL, 2FR, 2RL and 2RR that are detected by the associated pressure sensors, and then the flow of control proceeds to step 160.

In step 160, the flag Fs is set to "2", and then the flow of control proceeds to step 170.

In step 170, it is judged whether or not the electric current Ib calculated in step 70 is not less than a reference value Ibo. If it is judged that the current Ib is less than Ibo, the flow of control is returned to step 30, whereas if it is judged that the current Ib is not less than Ibo, the flow of control proceeds to step 180.

In step 180, it is judged whether or not the pressure Ps in the high pressure line read in in step 30 is not less than a reference value Pso which is lower than the threshold value Pc. If it is judged that Ps is less than Pso, then the flow of control is returned to step 30, whereas if it is judged that Ps is not less than Pso, the flow of control proceeds to step 190.

In step 190, the electric currents Ibi calculated in step 150 or the electric currents Iui calculated in step 110 are supplied to the solenoids 78, 58, 82 and 80 incorporated in the variable throttle means included in the associated pressure control means so that they are operated to adjust the pressures in the working fluid chambers in the associated actuators, and then the flow of control is returned to step 30. Thus, the steps 30 through 190 are repeated.

In step 200, the supply of the electric current to the solenoid 190 in the electromagnetic on-off valve 186 is stopped to open the bypass control means 196, and then the flow of control proceeds to step 210.

In step 210, the main relay is turned off to finish the control flow shown in FIG. 3, and the supply of electricity to the electric control device 200 shown in FIG. 2 is stopped.

It is to be noted that the pressure control conducted by the bypass control means when the system is started forms no essential part of the present invention. For more details in this regard, if desired, reference should be made to Japanese Patent Application 63-307189 assigned to the assignee as the present application. It is also to be understood that the pressure control conducted by the bypass control means for stopping the system may be carried out in the same manner as in the system described in Japanese Patent Application 63-307190 assigned to the same assignee as the present application.

Referring next to the FIGS. 6A through 6C and FIGS. 7 through 25, calculations for the active control conducted in the above-mentioned step 110 according to a first embodiment will be described.

Figure 7:
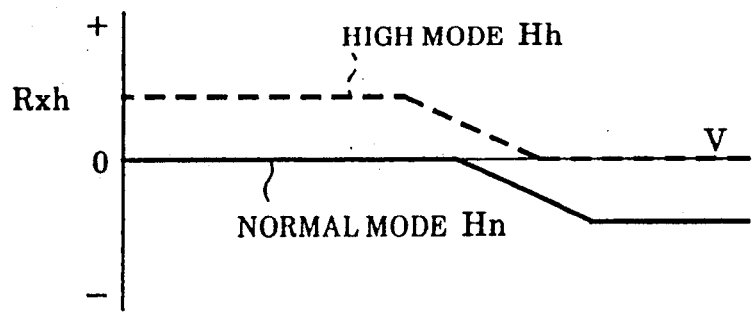
FIG. 7 is a graph showing a relationship between a vehicle speed V and a target displacement Rxh.
Figure 8:
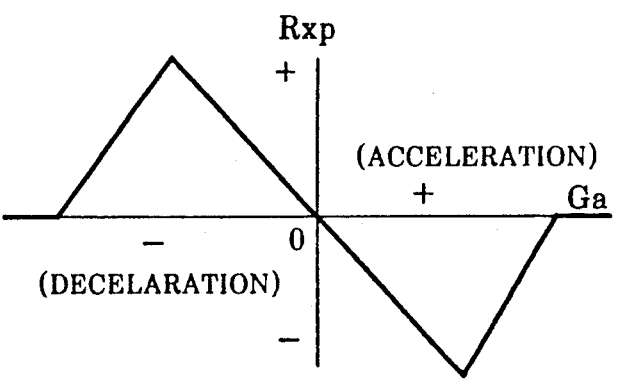
FIG. 8 is a graph showing a relationship between a longitudinal acceleration Ga and a target displacement Rxp.
Figure 9:
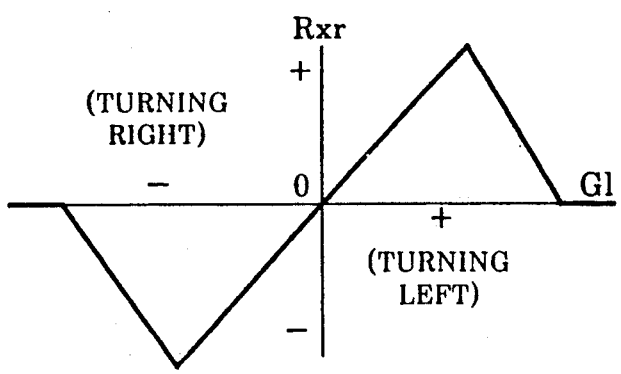
FIG. 9 is a graph showing a relationship between a lateral acceleration Gl and a target displacement Rxr.
Figure 10:
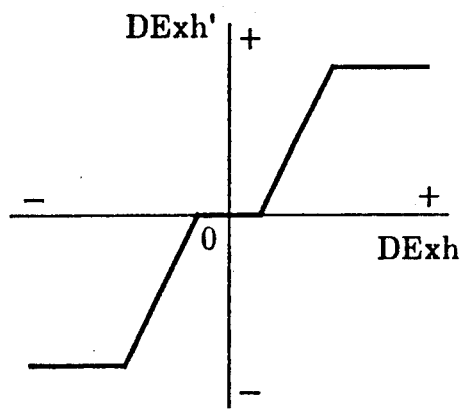
FIGS. 10 through 21 are graphs showing maps for the modifications of the differentiations by time of the differences of the displacement modes.
Figure 11:
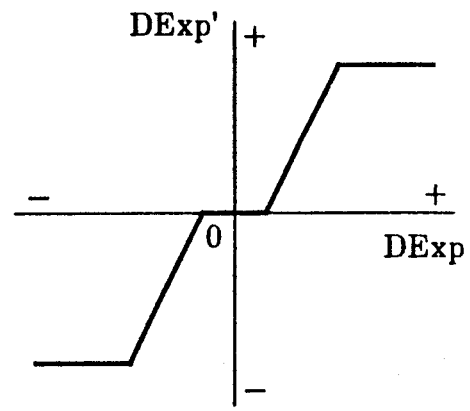
Figure 12:
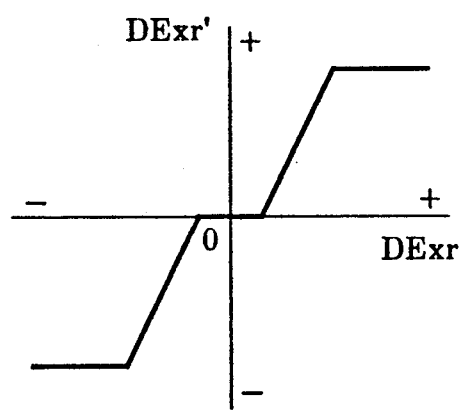
Figure 13:
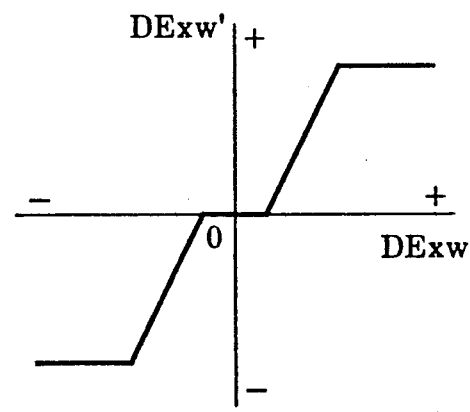
Figure 14:
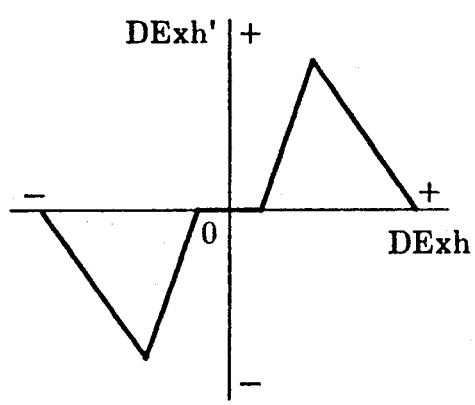
Figure 15:
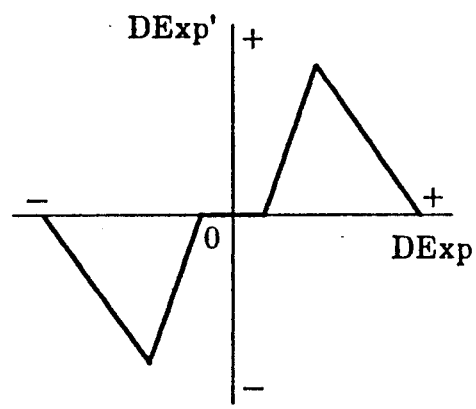
Figure 16:
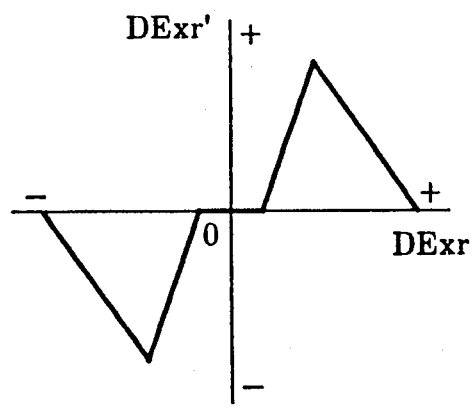
Figure 17:
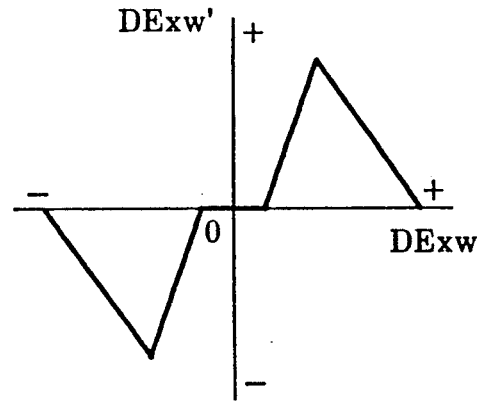
Figure 18:
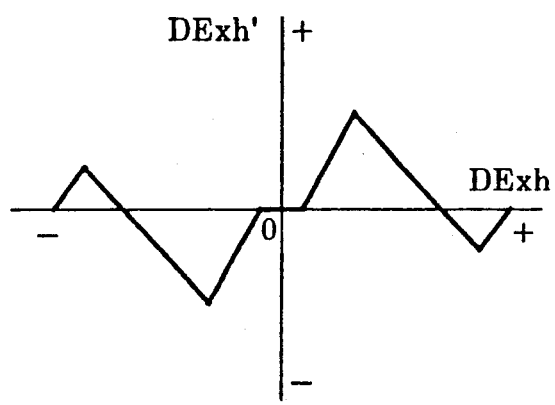
Figure 19:
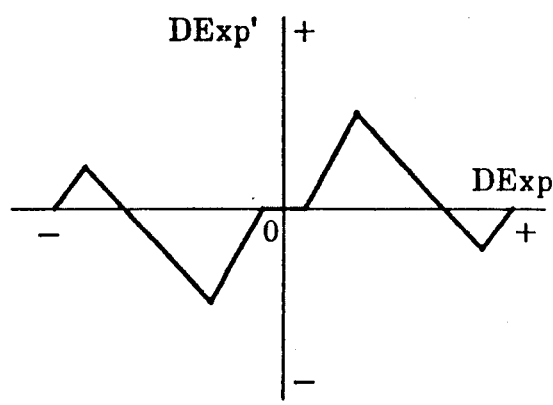
Figure 20:
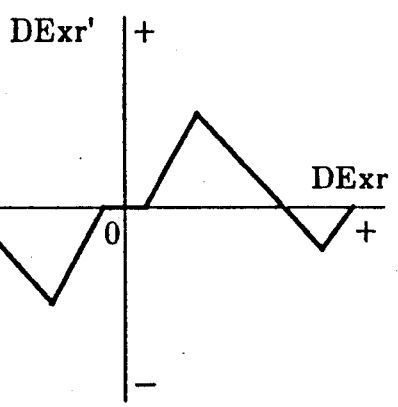
Figure 21:
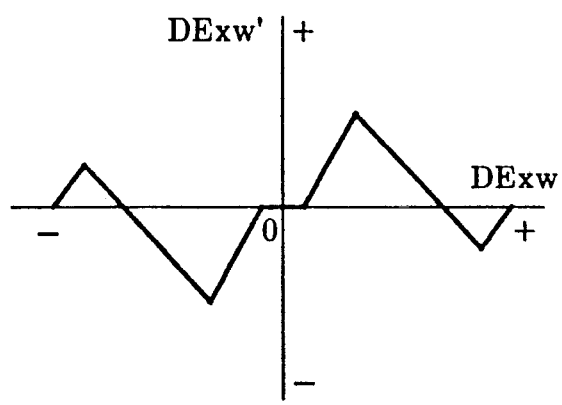

In step 300, based upon maps such as the graphs shown in FIGS. 7 through 9, target values Rxh, Rxp and Rxr for the heave, pitch and roll, respectively, required for attaining a desired posture of the vehicle body are calculated, and then the flow of control proceeds to step 310.

It is to be noted that in FIG. 7, the solid line shows a normal mode pattern which is set up when the vehicle height setting switch is set to a normal mode and the dotted line shows a high mode pattern which is set up when the vehicle height setting switch is set to a high mode.

In step 310, based upon the vehicle heights X1, X2, X3 and X4 at the front left, front right, rear left, and rear right wheels read in in step 30, calculations for converting the displacements into values of heave "Xxh", pitch "Xxp", roll "Xxr" and warp "Xxw" are carried out according to the following equations, and thereafter the flow of control proceeds to step 320:

$$Xxh = (X1 + X2) + (X3 + X4)$$

$$Xxp = -(X1 + X2) + (X3 + X4)$$

$$Xxr = (X12 - X2) + (X3 - X4)$$

$$Xxw = (X1 - X2) - (X3 - X4)$$

In step 320, differences in the respective mode values are calculated according to the following equations, and then the flow of control proceeds to step 330:

$$Exh = Rxh - Xxh$$

$$Exp = Rxp - Xxp$$

$$Exr = Rxr - Xxr\ ps$$

$$Exw = Rxw - Xxw$$

In this connection, Rxw may be zero, or a value of Xxw calculated in step 410 just after the active suspension system has been started up to operate or an average value of Xxw calculated in the last few cycles. If the absolute value of Exw is equal to or less than W1 (a certain positive constant), Exw is set to zero.

In step 330, denoting $Ej(n)$ ($j = xh, xp, xr, xw$) to be the current value of $Ej$ and $Ej(n-n1)$ to be the value of $Ej$ at a cycle preceding the current by n1 cycles, differentiations by time of the differences of the displacement modes are calculated according to the following equations, and thereafter the flow of control proceeds to step 340:

$$Dexh = (Exh(n) - Exh(n - n1))$$

$$DExp = Exp(n) - Exp(n - n1)$$

$$DExr = Exr(n) - Exr(n - n1)$$

$$DExw = Exw(n) - Exw(n - n1)$$

In step 340, denoting Vo to be the lower limit value detectable by the vehicle speed sensor, it is judged whether or not the vehicle speed V is less than the Vo, i.e. whether or not the vehicle is stopped. When it is judged that V is neither equal to nor less than Vo, the flow of control proceeds to step 360, whereas when it is judged that V is equal to or less Vo, the flow of control proceeds to step 350.

In step 350, based upon maps such as the graphs of FIGS. 10 through 13 calculations for modifications of the differentiations by time of the respective modes DExh, DExp, DExr and DExw to DExh', DExp', DExr' and DExw', respectively, are carried out. The maps of FIGS. 10 through 13 are for use in the modification of the differentiations by time of the modes DExh, DExp, DExr and DExw when the vehicle is substantially stopped. As shown in these maps, the values of DExh, DExp, DExr and DExw are respectively modified to remain substantially zero when the actual values thereof are very small, then to be increased substantially proportionally along with the increase of the actual values thereof until the actual values thereof reach certain threshold values predetermined therefor, and then to remain substantially constant when the actual values thereof further increase. It will be noted that the lines in the first and third opposite quadrants of the graphs are symmetrical to one another, indicating that the suspension control is performed in a symmetrical manner around a neutral point of displacement of the actuator at each wheel. Then the flow of control proceeds to step 390.

In step 360, it is judged whether or not the road is rough, and when it is judged that the road is rough, the flow of control proceeds to step 380, whereas when it is judged that the road is not rough, the flow of control proceeds to step 370.

The judgement with regard to the roughness of the road may be made based upon the detection of the vehicle height as described in the specification of Japanese Patent Application Publication 2-175405 or a warp such as Xxw described in the specification of Japanese Patent Application 1-310136 Publication 3-3103, both having been assigned to the same assignee as the present application.

In step 370, based upon maps such as the graphs of FIGS. 14 through 17 calculations for modifications of the differentiations of the modes DExh, DExp, DExr and DExw to DExh', DExp', DExr' and DExw', respectively, are carried out. The maps of FIGS. 14 through 17 are for use in the modification of the differentiations by time of the modes DExh, DExp, DExr and DExw when the vehicle is running on a relatively smooth road. As shown in these maps, the values of DExh, DExp, DExr and DExw are respectively modified to remain substantially zero when the actual values thereof are very small, then to be increased substantially proportionally along with an increase of the actual values thereof until the actual values thereof reach certain threshold values predetermined therefor, and then to be decreased along with further increase of the actual value thereof beyond said threshold value. Similarly, the lines in the first and third opposite quadrants of the graphs are symmetrical to one another, indicating that the suspension control is performed in a symmetrical manner around a neutral point of displacement of the actuator at each wheel. Then the flow of control proceeds to step 390.

In step 380, based upon maps such as the graphs FIGS. 18 through 21 calculations for the modifications of the differentiations of the modes DExh, DExp, DExr and DExw to DExh', DExp', DExr' and DExw', respectively, are carried out. The maps of FIGS. 18 through 21 are for use in the modification of the differentiations by time of the modes DExh, DExp, DExr and DExw when the vehicle is running on a rough road. As shown in these maps, the values of DExh, DExp, DExr and DExw are respectively modified to remain substantially zero when the actual values thereof are very small, then to be increased substantially proportionally along with increase of the actual values thereof until the actual values thereof reach certain threshold values predetermined therefor, then to be decreased so far as to be opposite to the actual values thereof in sign along with further increase of the actual value thereof beyond said threshold value until the actual values thereof reach certain higher values predetermined therefor and then to be again increased to be substantially proportionately along with increase of the actual values thereof. Similarly, again, the lines in the first and third opposite quadrants of the graphs are symmetrical to one another, indicating that the suspension control is performed in a symmetrical manner around a neutral point of displacement of the actuator at each wheel. Then the flow of control proceeds to step 390.

In step 390, calculations for PID compensations in a displacement feedback control are conducted according to the following equations, and thereafter the flow of control proceeds to step 400.

$$Cxh = Kpxh \cdot Exh + Kixh \cdot Ixh(n) + Kdxh \cdot DExh'$$

$$Cxp = Kpxp \cdot Exp + Kixp \cdot Ixp(n) + Kdxp \cdot DExp'$$

$$Cxr = Kpxr \cdot Exr + Kixr \cdot Ixr(n) + Kdxr \cdot DExr'$$

$$Cxw = Kpxw \cdot Exw + Kixw \cdot Ixw(n) + Kdxw \cdot DExw'$$

In the above equations, denoting Ij(n) and Ij(n−1) to be the current value Ij and the value of Ij at the cycle preceding the current by one cycle, and Tx to be a time constant, respectively:

$$Ij(n) = Ej(n) + Tx \cdot Ij(n-1)$$

Assuming Ijmax to be a predetermined value, the absolute value of Ij is equal to or smaller than Ijmax. The coefficients Kpj, Kij and Kdj (n=xh, xp, xr and xw) are proportional constants, integration constants and differentiation constants, respectively.

In step 400, calculations for reversal conversion of the displacement modes are carried out according to the following equations, and then the flow of control proceeds to step 350:

$$Px1 = \tfrac{1}{4} \cdot Kx1(Csh - Cxp + Cxr + Cxw)$$

$$Px2 = \tfrac{1}{4} \cdot Kx2(Cxh - Cxp - Cxr - Cxw)$$

$$Px3 = \tfrac{1}{4} \cdot Kx3(Cxh + Cxp + Cxr - Cxw)$$

$$Px4 = \tfrac{1}{4} \cdot Kx4(Cxh + Cxp - Cxr + Cxw)$$

wherein Kx1, Kx2, Kx3 and Kx4 are proportional constants.

Figure 22:
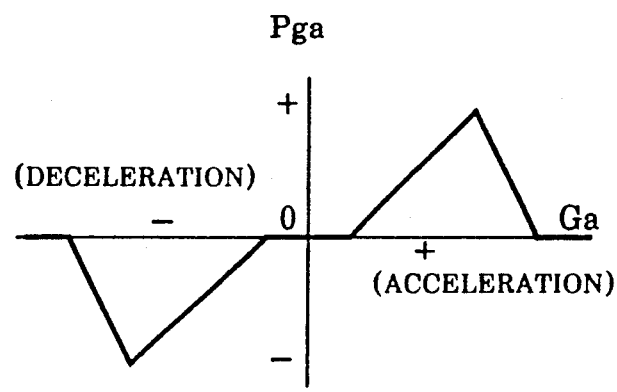
FIG. 22 is a graph showing a relationship between a longitudinal acceleration Ga and a pressure compensation amount Pga.
Figure 23:
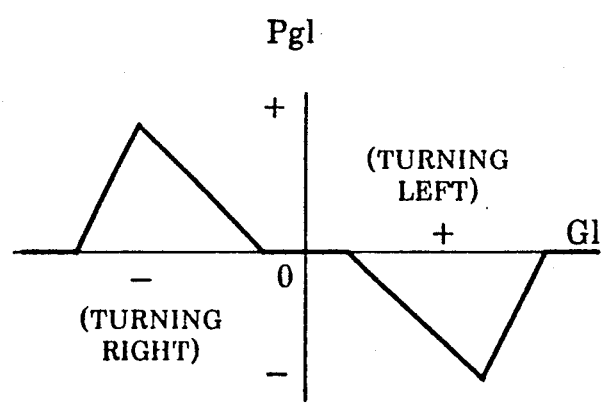
FIG. 23 is a graph showing a relationship between a lateral acceleration Gl and a pressure compensation amount Pgl.

In step 410, based upon maps such as the graphs shown in FIGS. 22 and 23, pressure compensation amounts Pga and Pgl in the longitudinal and lateral directions, respectively, are calculated, and then the flow of control proceeds to step 420:

In step 420, calculations for PD compensations for an acceleration feedback control are carried out with respect to pitch (Cgp) and roll (Cgr) according to the following equations, and thereafter the flow of control proceeds to step 430:

$$Cgp = Kpgp \cdot Pga + Kdgp[Pga(n) - Pga(n-n1)]$$

$$Cgr = Kpgr \cdot Pgl + Kdgr[Pgl(n) - Pgl(n-n1)]$$

Here Pga(n) and Pgl(n) are present Pga and Pgl, respectively, and Pga(n−n1) and Pgl(n−n1) are Pga and Pgl at the cycle which is preceding by n1 cycles to the present cycle. Kpgp and Kpgr are proportional constants, while Kdgp and Kdgr are differentiation constants.

In step 430, denoting the steering angle read in in step 30 at the cycle preceding the current by one cycle in the flowchart of FIG. 3 as As', steering angle velocity RAs is calculated according to the following equation:

$$RAs = As - As'$$

Figure 24:
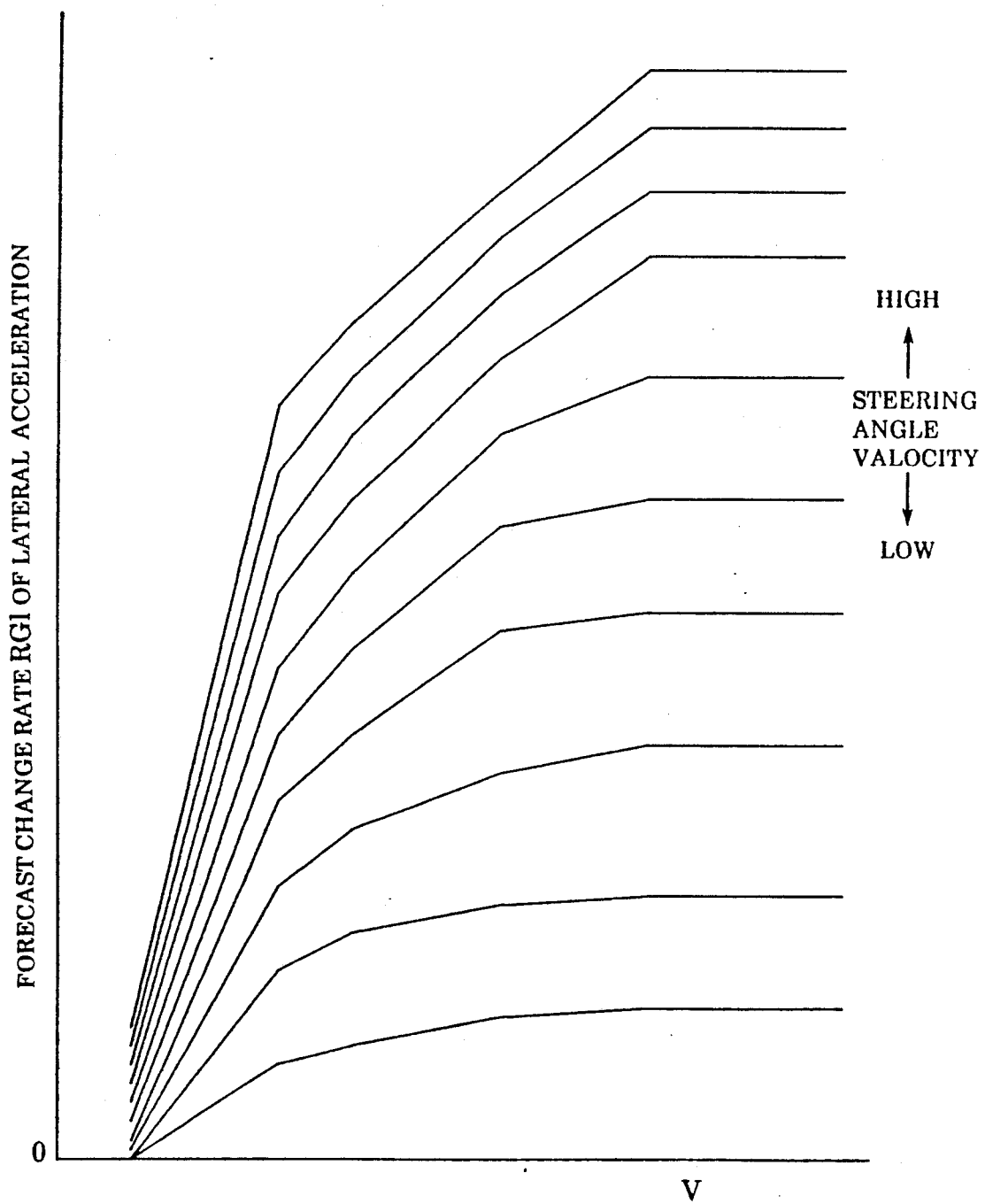
FIG. 24 is a graph showing a relationship among vehicle speed V, steering angle velocity RAs and changing rate RGl of the forecast lateral acceleration.

Then based upon a map such as the graph shown in FIG. 24, the steering angle velocity RAs calculated above, and vehicle speed V, a forecast change rate RGl of the lateral acceleration Gl is calculated, and therefater the flow of control proceeds to the 440.

In step 440, calculations for reversal conversion of the acceleration modes are carried out according to the following equations, and then the flow of control proceeds to step 450:

$$Pg1 = Kg1/4 \cdot (-Cgp + K2f \cdot Cgr + K1f \cdot RGl)$$

$$Pg2 = Kg2/4 \cdot (-Cgp - K2f \cdot Cgr - K1f \cdot RGl)$$

$$Pg3 = Kg3/4 \cdot (Cgp + K2r \cdot Cgr + K1r \cdot RGl)$$

$$Pg4 = Kg4/4 \cdot (Cgp - K2r \cdot Cgr - K1r \cdot RGl)$$

In the above equations Kg1, Kg2, Kg3 and Kg4 are proportional constants, and K1f, K1r, K2f, and K2r are constants for distributing gains between the front and rear vehicle wheels.

In step 450, based upon the pressures Pbi stored in the RAM 208 in step 150 and the results of calculations in steps 400 and 440, target pressures Pui for the pressure control means are calculated according to the following equations, and thereafter the flow of control proceeds to step 460:

$$Pui = Pxi + Pgi + Pbi (i = 1, 2, 3 \text{ and } 4)$$

In the step 460, target electric currents to be supplied to the pressure control means are calculated according to the following equations, and then the flow of control proceeds to step 440:

$$I1 = Ku1 \cdot Pu1 + Kh(Psr - Ps) - Kl \cdot Pd - a$$

$$I2 = Ku2 \cdot Pu2 + Kh(Psr - Ps) - Kl \cdot Pd - a$$

$$I3 = Ku3 \cdot Pu3 + Kh(Psr - Ps) - Kl \cdot Pd$$

$$I4 = Ku4 \cdot Pu4 + Kh(Psr - Ps) - Kl \cdot Pd$$

It is to be noted that Ku1, Ku2, Ku3, Ku4 are proportional constants for the corresponding vehicle wheels; Kh and Kl are compensation coefficients for the pressures in the high pressure and the low pressure lines, respectively; a is a compensation constant between the front and rear vehicle wheels; and Psr is a standard pressure in the high pressure line.

Figure 25:
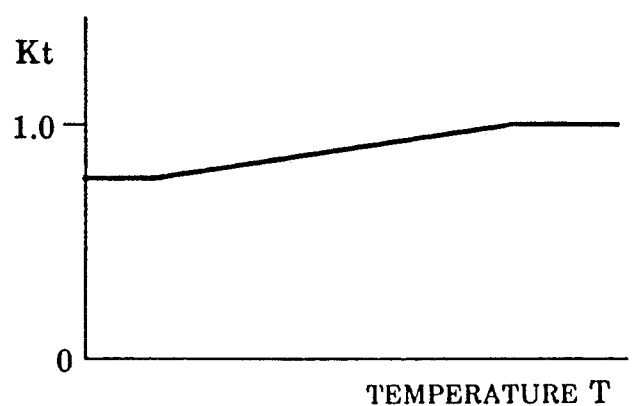
FIG. 25 is a graph showing a relationship between temperature T of oil and a compensation coefficient Kt.

In step 470, based upon the temperature T of oil read in in step 30 and the map of the graph shown in FIG. 25, a compensation coefficient Kt for the oil temperature is calculated, and the calculations for compensating the target electric currents with respect to the oil temperature are carried out according to the following equation, and then the flow of control proceeds to step 480:

$$Iti = Kt \cdot Ii \ (i = 1, 2, 3 \text{ and } 4)$$

In step 480, an electric current for a warping, i.e., a twisting of the vehicle body about the longitudinal axis thereof, is calculated according to the following equation, and thereafter the flow of control proceeds to step 490:

$$Iw = (It1 - It2) - (It3 - It4)$$

In step 490, denoting the target electric current value for warping as Riw, a difference of the electric current for warping from the target value therefor is calculated according to the following equation, and then the flow of control proceeds to step 500:

$$Eiw = Riw - Iw$$

In the above equation the target electric current value for warping Riw may be zero.

In step 500, employing a proportional constant Kiwp a target control value of the electric current for warping is calculated according to the following equation, and then the flow of control proceeds to step 510:

$$Eiwp = Kiwp \cdot Eiw$$

In step 510, calculations for reversal conversions of the electric current for warping are carried out according to the following equations, and thereafter the flow of control proceeds to step 520:

$$Iw1 = Eiwp/4$$

$$Iw2 = -Eiwp/4$$

$$Iw3 = -Eiwp/4$$

$$Iw4 = Eiwp/4$$

In step 520, based upon the values obtained by the calculations conducted in steps 470 and 510, final target electric currents Iui to be supplied to the pressure control means are calculated according to the following equation, and then the flow of control proceeds to the step 170 shown in FIG. 3.

$$Iui = Iti + Iwi \ (i = 1, 2, 3 \text{ and } 4)$$

Thus, according to the shown embodiment, when the differentiations by time of the differences of the respective displacement modes calculated in step 330, i.e. the rates of change of the vehicle heights, are high, the rates of change of the vehicle heights are modified to be lower DExh', DExt', DExr'and DExw' in step 350, 370 or 380, and based upon these calculations, in step 390 the PID compensation calculations for the displacement feedback control are carried out. Therefore it is avoided that the rate of change of the vehicle height gets so large as to give the passengers an uncomfortable feeling.

Particularly, when the vehicle is running on a rough road so that the judgements at steps 340 and 360 are "no" and "yes", respectively, and the rate of change of the vehicle height fluctuates at a high frequency and a wide amplitude, the rate of change of the vehicle height is modified to be substantially lowered in step 380, and based upon the values thus decreased by the modification the PID compensation for the displacement feedback control is carried out in step 390 and so on. Thus, it is avoided that an abnormal vibration of the suspension occurs, a noise is generated or the consumption of working fluid increases.

From the view point of the comfortableness in driving the vehicle it is desirable that the amount of suspension control based upon the rate of change of the vehicle height is small, whereas in order to effectively suppress a change of the vehicle height it is desirable that the amount of suspension control based upon the rate of change of the vehicle height is large, and therefore, it is difficult to determine the best condition for reflecting the rate of change of the vehicle height on the suspension control. However, according to the above described embodiment of the present invention, the value for use in the suspension control of the rate of change of the vehicle height is modified to be decreased from the actual value thereof when it is going to be very high. Therefore, the comfortableness of the vehicle in the running on a rough road is much improved.

When the vehicle is stopped, wherein it is judged "yes" in step 340, the amount of the decreasing modification for the rate of change of the vehicle height is small as compared with that in the other operating conditions. In this case, in step 390 the PID compensation calculations in the displacement feedback control are performed based upon a relatively large rate of change of the vehicle height, and therefore, the change of the posture of the vehicle body due to getting on or off of the passenger while the vehicle is stopped is effectively suppressed.

Figure 26:
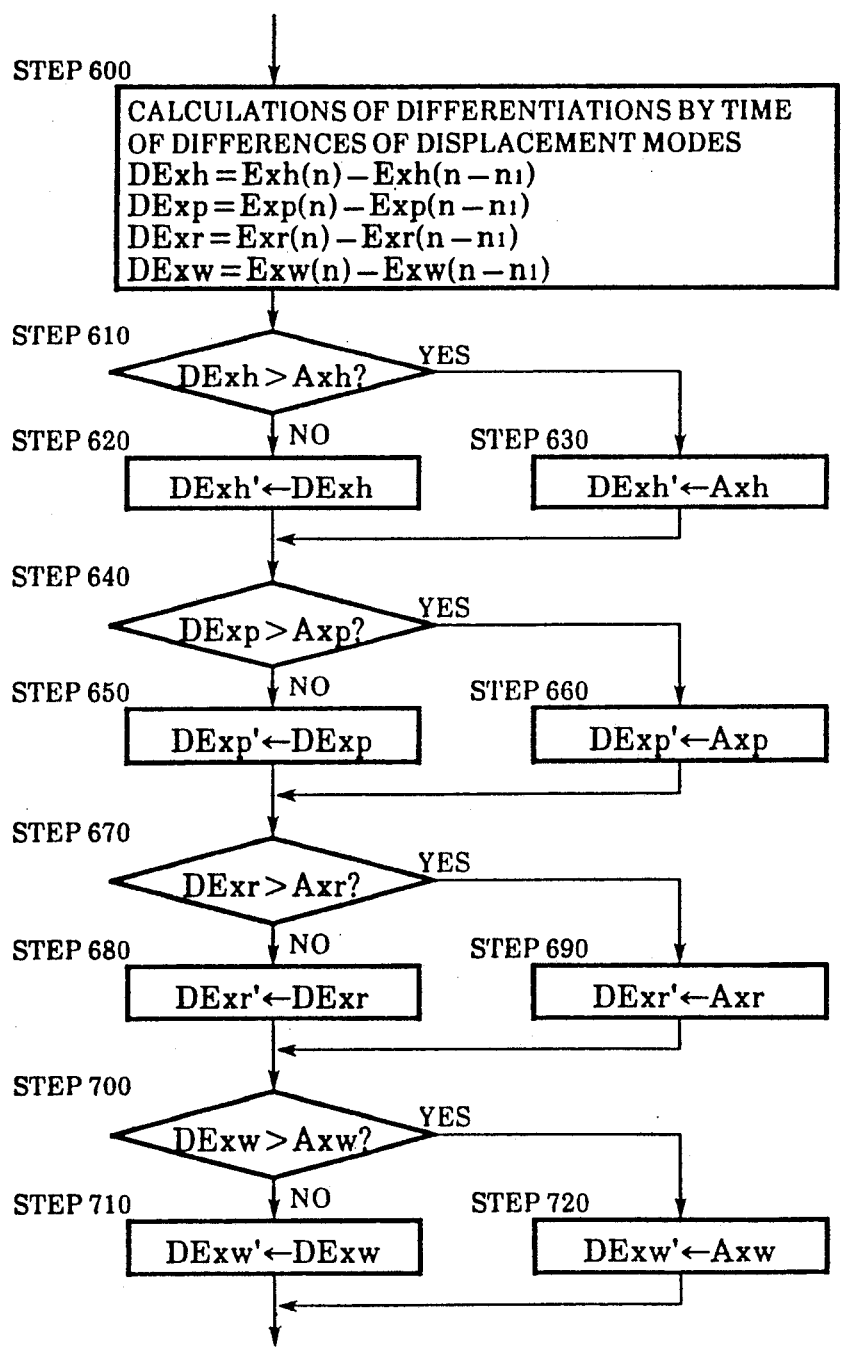
FIG. 26 is a flowchart showing the calculation routine for the modifications of the differentiation by time of the differences of the displacement modes according to a second embodiment of the present invention.
Figure 27:
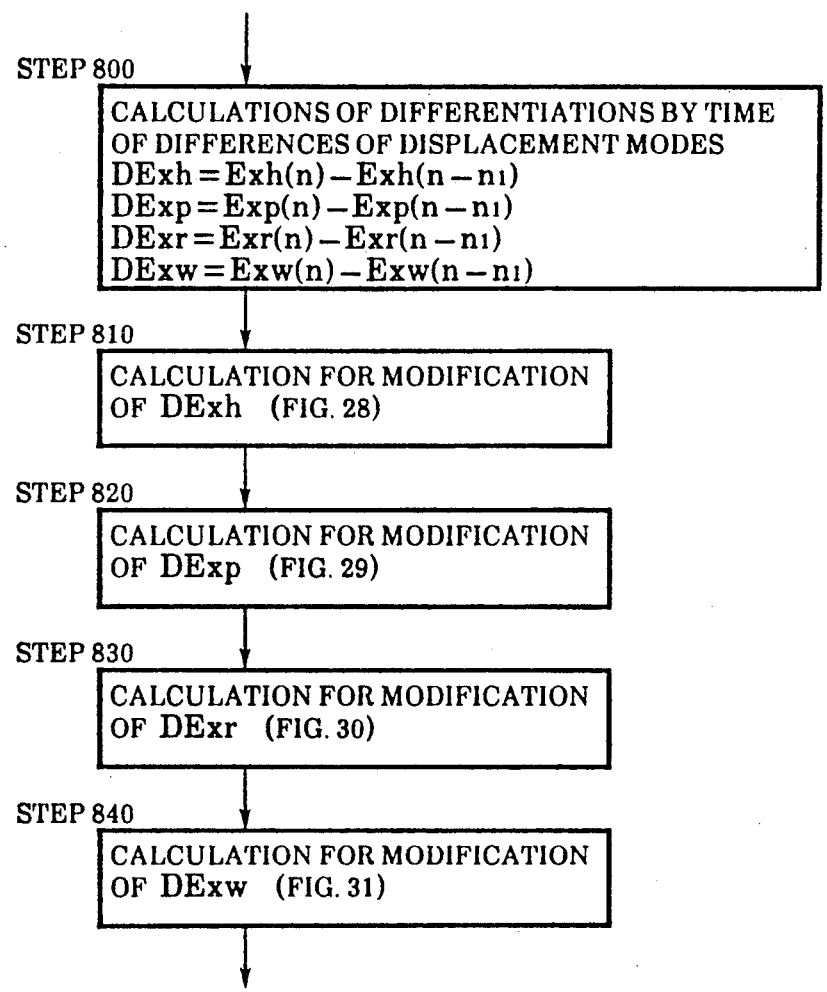
FIG. 27 is flowchart showing the calculation routine for the modifications of the differentiation by time of the differences of the displacement modes according to a third embodiment of the present invention.

FIGS. 26 and 27 show flowcharts for the calculations for the modifications of the differentiations by time of the differences of the displacement modes according to a second and a third embodiment of the present invention. These flowcharts may be performed instead of the steps 330-180 in the above described embodiment. The calculations performed in steps 600 and 800 are the same as those performed in step 330 of FIG. 6A. Therefore, no description will be required for these steps.

In the embodiment shown in FIG. 26, subsequent to step 600, in step 610 it is judged whether or not the differentiation by time of the difference, DExh, is greater than a standard value Axh. If the answer is "no" the flow of control proceeds to step 620, whereas if the answer is "yest" the flow of control proceeds to step 630.

In step 620, the modified value DExh' is made to be the same as the actual value DExh, and the flow of control proceeds to step 640.

In step 630, the modified value DExh' is made to Axh, and the flow of control proceeds to step 640.

In step 640 is is judged whether or not the differentiation by time of the pitch difference, DExp, is greater than a standard value Axp. If the answer is "no" the flow of control proceeds to step 650, whereas if the answer is "yes" the flow of control proceeds to step 660.

In step 650, the modified value DExp' is made to be the same as the actual value DExp, and the flow of control proceeds to step 670.

In step 660, the modified value DExp' is made to Axp, and the flow of control proceeds to step 670.

In step 670 it is judged whether or not the differentiation by time of the roll difference, DExr, is greater than a standard value Axr. If the answer is "no" the flow of control proceeds to step 680, whereas if the answer is "yes" the flow of control proceeds to step 690.

In step 680, the modified value DExr' is made to be the same as the actual value DExr, and the flow of control proceeds to step 700.

In step 690, the modified value DExr' is made to Axr, and the flow of control proceeds to step 700.

In step 700 it is judged whether or not the differentiation by time of the warp difference, DExw, is greater than a standard value Axw. If the answer is "no" the flow of control proceeds to step 710, whereas if the answer is "yes" the flow of control proceeds to step 720.

Figure 6A:
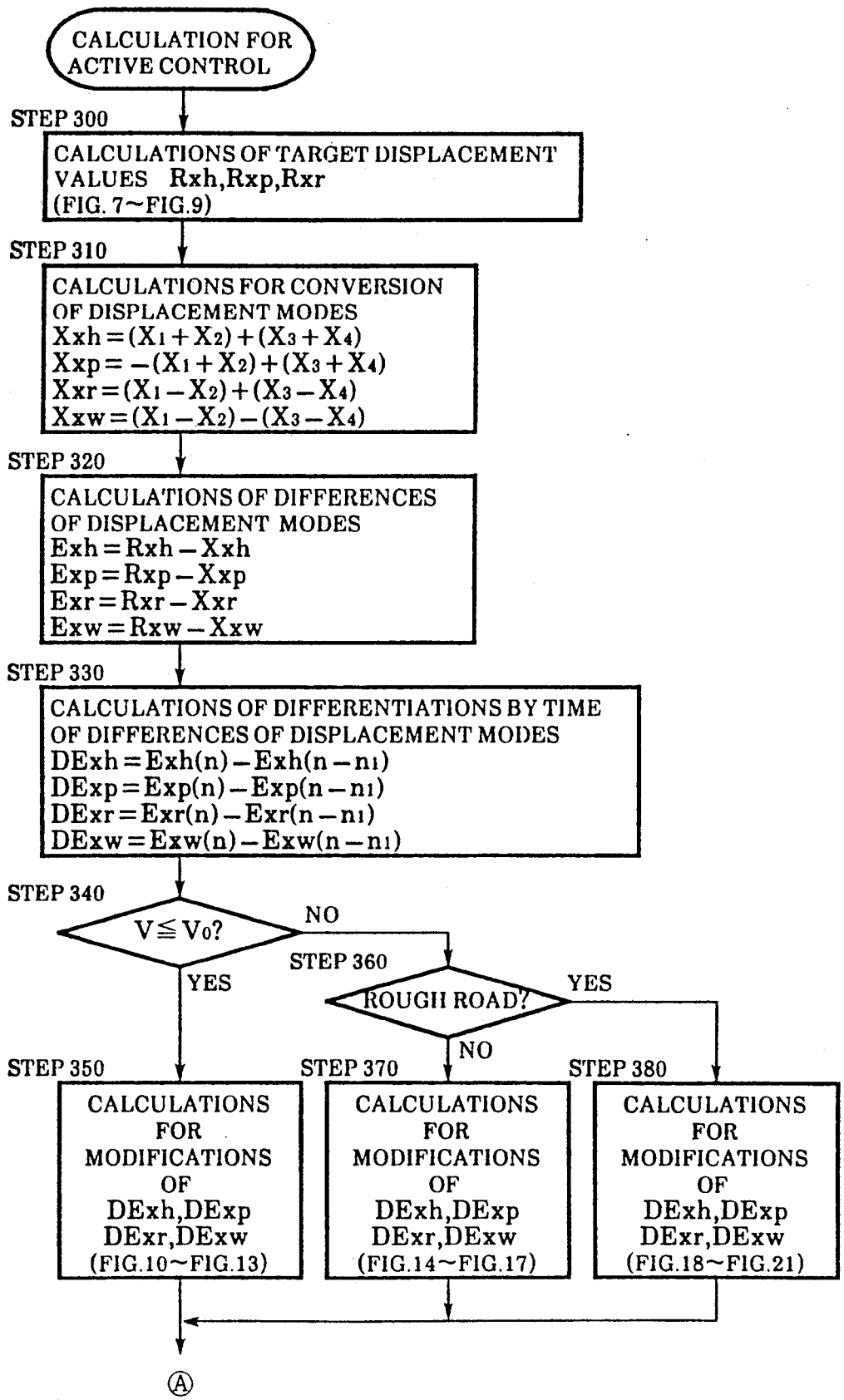
FIGS. 6A through 6C are flowcharts showing subroutine calculations for the active control carried out in step 110 in the flowchart shown in FIG. 3 according to a first embodiment of the present invention.
Figure 6B:
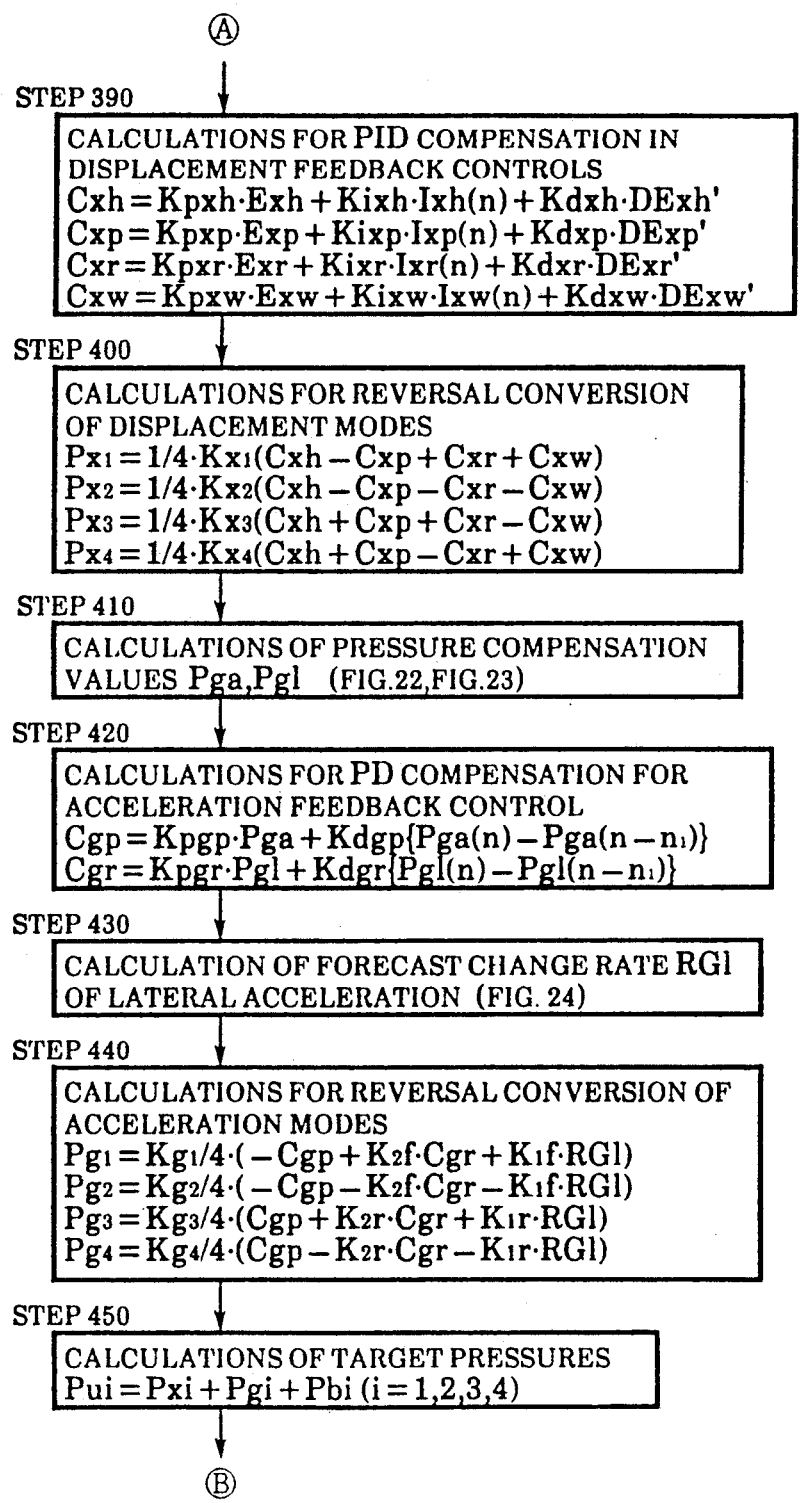

In step 710. the modified value DExw' is made to be the same as the actual value DExw, and the flow of control proceeds to step 390 in FIG. 6B.

In step 720, the modified value DExw' is made to Axw, and the flow of control proceeds to step 390 in FIG. 6B.

Therefore, in this second embodiment the values for use in the suspension displacement modes are modified to be equal to the actual values thereof as long as the actual values do not exceed certain threshold values therefor, and when the actual values thereof exceed the threshold values, they are modified to remain to be the threshold values.

Figure 28:
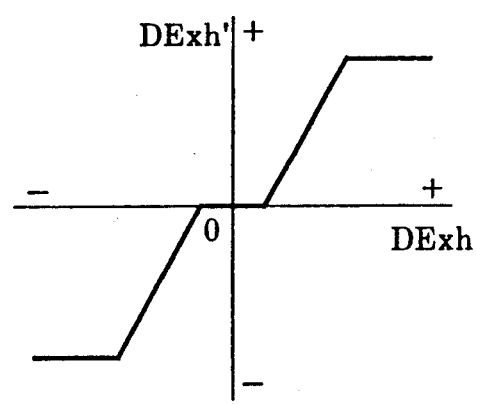
FIGS. 28 through 31 are graphs showing maps used for the modifications of the displacement modes in the embodiment shown in FIG. 27.

In the embodiment shown in FIG. 27, subsequent to step 800, in step 810 calculation for the modification of the displacement mode DExh is carried out based upon a map such as the graph of FIG. 28, and then the flow of control proceeds to step 820.

Figure 29:
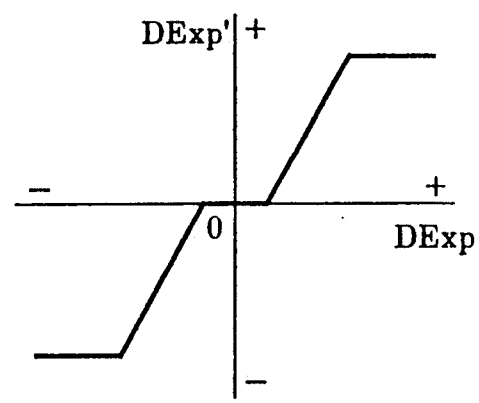

In step 820 calculation for the modification of the displacement mode DExp is carried out based upon a map such as the graph of FIG. 29, and then the flow of control proceeds to step 830.

Figure 30:
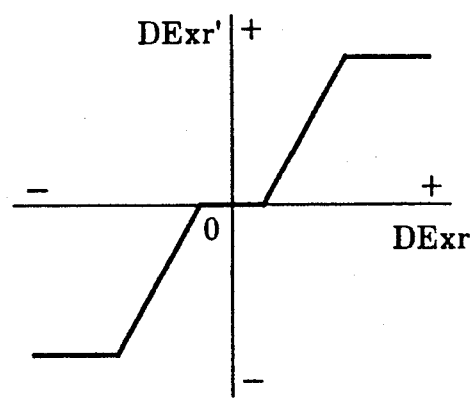

In step 830 calculation for the modification of the displacement mode DExr is carried out based upon a map such as the graph of FIG. 30, and then the flow of control proceeds to step 840.

Figure 31:
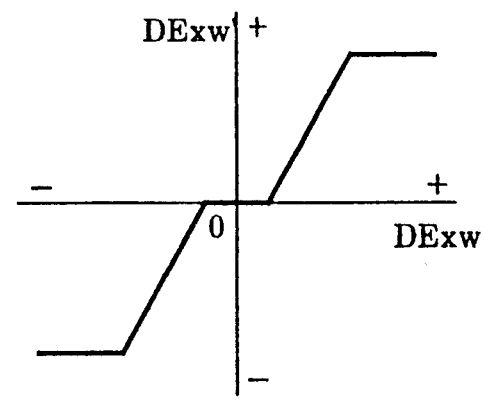

In step 840 calculation for the modification of the displacement mode DExw is carried out based upon a map such as the graph of FIG. 31, and then the flow of control proceeds to the step 390 of FIG. 6B.

In these second and third embodiments it is omitted to vary the manner of modifications of the differentiations by time of the differences of the displacement modes according to the running speed or the roughness conditions of the road. Even in these embodiments the above-mentioned problems of generating shocks or noise due to too rapid operation of the suspension actuators are effectively avoided by the above-mentioned threshold values which are appropriately determined. The general shapes of the maps shown in FIGS. 28 through 31 are similar to those shown in FIGS. 10 although 13, though the scales may not be the same.

Thus, also according to these embodiments, when the rate of change of the vehicle height is large, the value thereof for use in the suspension control is modified to be smaller than the actual value thereof, and based upon the decreased rate of change of the vehicle height, DExh', DExp', DExr' and DExw', the calculations for the PID compensation for the feedback control of the vehicle height are performed, so that it is avoided that a shock to give a discomfort feeling to the passengers occurs in the vehicle body due to a very large rate of change of the vehicle body.

Figure 32A:
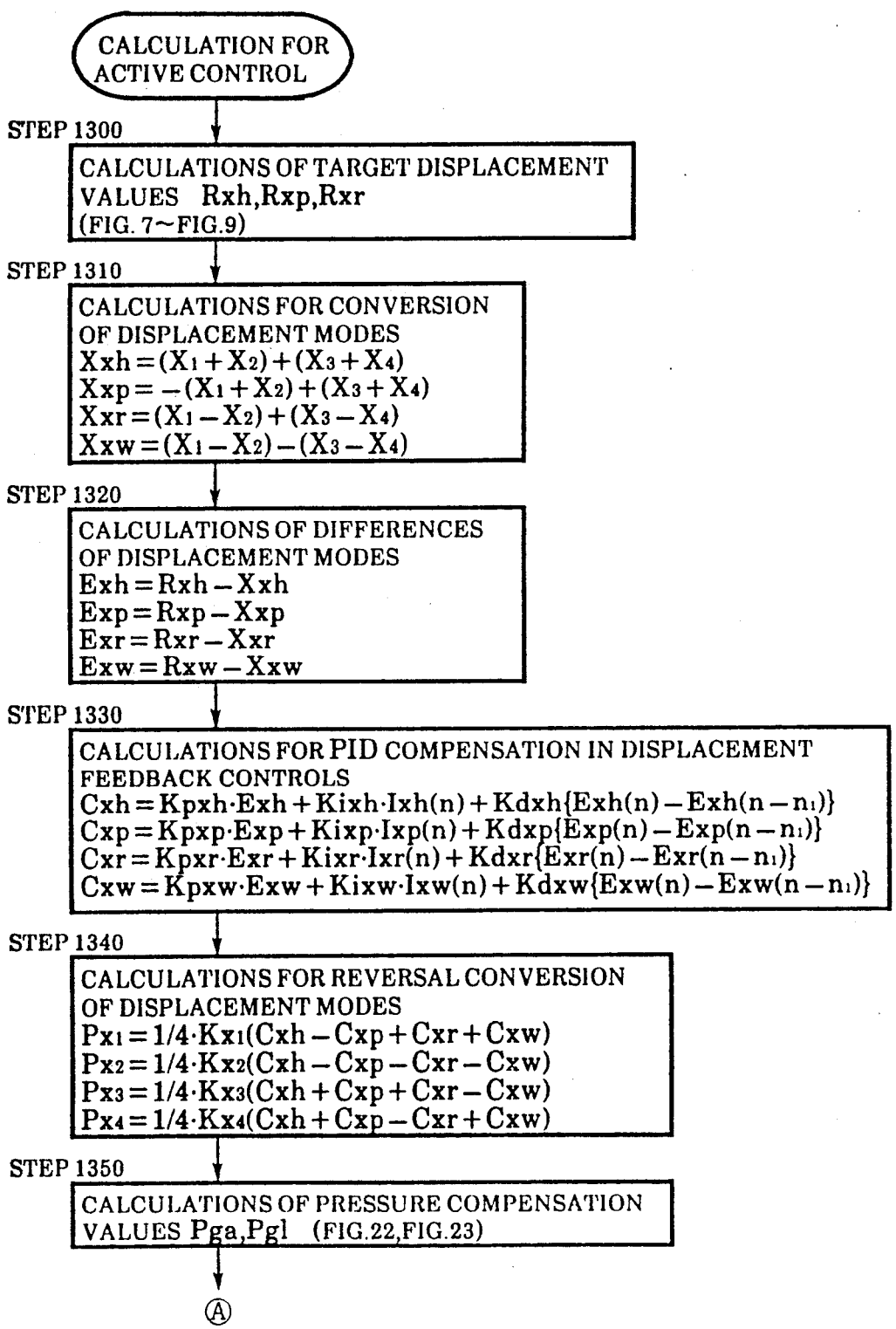
FIGS. 32A through 32C are flowcharts showing the subroutine calculations for the active control carried out in step 110 in the flowchart shown in FIG. 3 according to a fourth embodiment of the present invention.
Figure 32B:
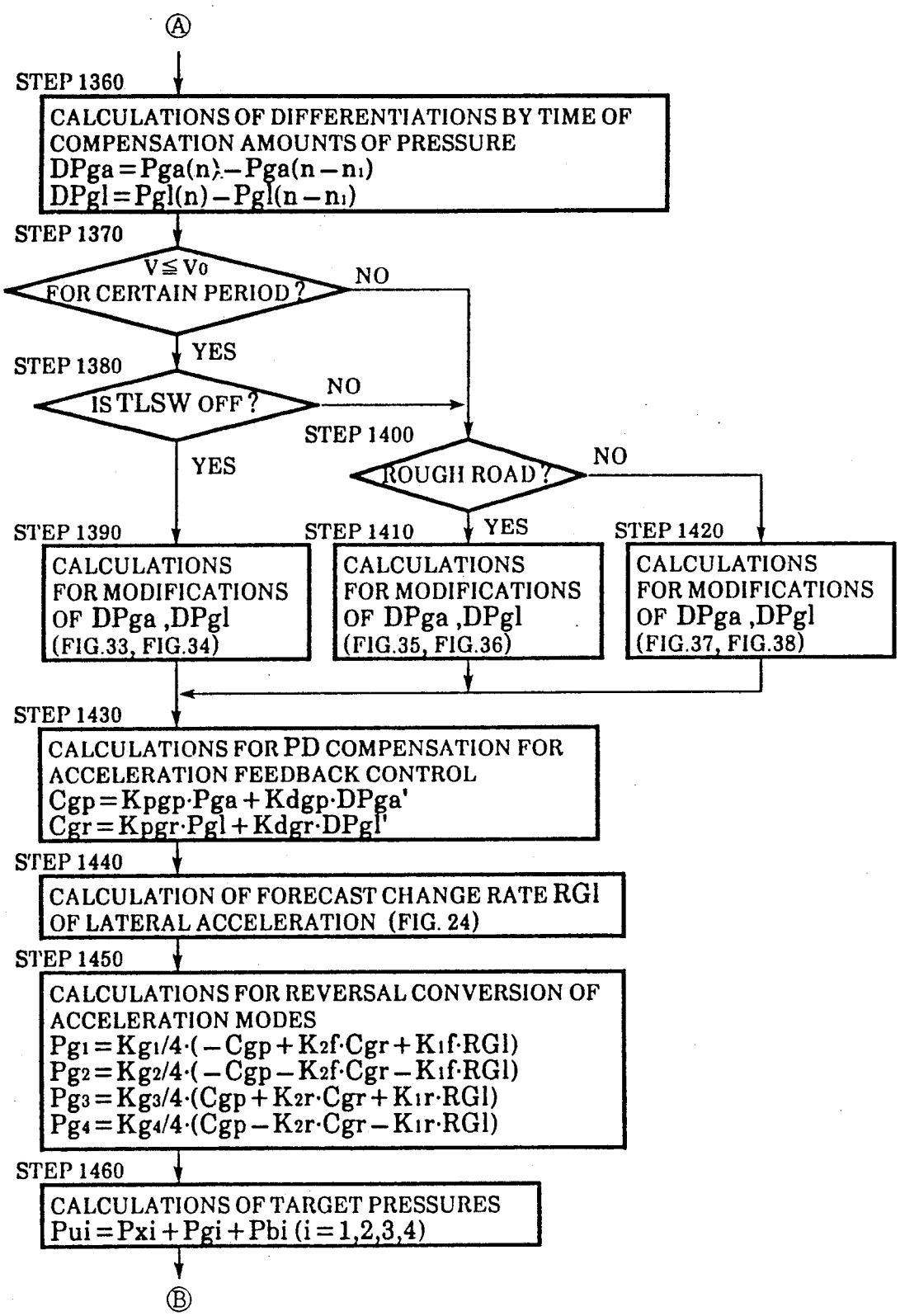

Next, referring to the FIGS. 32A and 32C and FIGS. 33 through 38, also again with reference to FIGS. 7 through 9 and FIGS. 22 through 25, still another embodiment of the calculations for the active control conducted in the above-mentioned step 110 will be described.

Referring to FIG. 32A, in step 1300, again based upon maps such as the graphs shown in FIGS. 7 through 9, target values Rxh, Rxp and Rxr for the heave, pitch and roll, respectively, required for attaining a desired posture of the vehicle body are calculated, and then the flow of control proceeds to step 1310.

In step 1310, based upon the vehicle heights X1, X2, X3 and X4 at the front left, front right, rear left, and rear right wheels read in in step 30, calculations for converting the displacements into values of heave "Xxh", pitch "Xxp", roll "Xxr" and warp "Xxw" are carried out according to the following equations. and thereafter the flow of control proceeds to step 1320:

$$Xxh = (x1 + X2) + (X3 + X4)$$

$$Xxp = -(X1 + X2) + (X3 + X4)$$

$$Xxr = (X1 - X2) + (X3 - X4)$$

$$Xxw = (X1 - X2) - (X3 - X4)$$

In step 1320, differences in the respective mode values are calculated according to the following equations, and then the flow of control proceeds to step 1330:

$$Exh = Rxh - Xxh$$

$$Exp = Rxp - Xxp$$

$$Exr = Rxr - Xxr$$

$$Exw = Rxw - Xxw$$

In this connection, Rxw may be zero, or a value of Xxw calculated in step 1410 just after the active suspension system has been started up to operate or an average value of Xxw calculated in the last few cycles. If the absolute value of Exw is equal to or less than W1 (a certain positive constant), Exw is set to zero.

In step 1330, calculations for PID compensations in the displacement feedback control are conducted according to the following equations, and thereafter the flow of control proceeds to step 1340.

$$Cxh = Kpxh \cdot Exh + Kixh \cdot Ixh(n) + Kdxh \cdot \{Exh(n) - Exh(n-n1)\}$$

$$Cxp = Kpxp \cdot Exp + Kixp \cdot Ixp(n) + Kdxp \cdot \{Exp(n) - Exp(n-n1)\}$$

$$Cxr = Kpxr \cdot Exr + Kixr \cdot Ixr(n) + Kdxr \cdot \{Exr(n) - Exr(n-n1)\}$$

$$Cxw = Kpxw \cdot Exw + Kixw \cdot Ixw(n) + Kdxw \cdot \{Exw(n) - Exw(n-n1)\}$$

In the above equations, $Ej(n)$ (j = xh, xp, xr, xw) are the current values of Ej, and $Ej(n-n1)$ are the values of Ej at the cycle preceding the current by n1 cycles. Further, denoting $Ij(n)$ and $Ij(n-1)$ to be the current value of Ij and the value of Ij at the cycle preceding the current by one cycle, and Tx to be a time constant, respectively:

$$Ij(n) = Ej(n) + Tx \cdot Ij(n-1)$$

Assuming Ijmax to be a predetermined value, the absolute value of Ij is equal to or smaller than Ijmax. The coefficients Kpj, Kij and Kdj (j = xh, xp, xr and xw) are proportional constants, integration constants and differentiation constants, respectively.

In step 1340, calculations for reversal conversion of the displacement modes are carried out according to the following equations, and then the flow of control proceeds to step 1350:

$$Px1 = \tfrac{1}{4} \cdot Kx1(Cxh - Cxp + Cxr + Cxw)$$

$$Px2 = \tfrac{1}{4} \cdot Kx2(Cxh - Cxp - Cxr - Cxw)$$

$$Px3 = \tfrac{1}{4} \cdot Kx3(Cxh + Cxp + Cxr - Cxw)$$

$$Px4 = \tfrac{1}{4} \cdot Kx4(Cxh + Cxp - Cxr + Cxw)$$

wherein Kx1, Kx2, Kx3 and Kx4 are proportional constants.

In step 1350, based upon maps such as the graphs shown in FIGS. 22 and 23, pressure compensations Pga and Pgl in the longitudinal and lateral directions, respectively, are calculated, and then the flow of control proceeds to step 1360:

In step 1360, denoting Pga(n) and Pgl(n) to be the current values of Pg and Pl, respectively, and Pga(n−n1) and Pgl(n−n1) to be the values of Pga and Pgl at the cycle preceding the current by n1 cycles, respectively, the differentiations by time of the compensation amounts of the pressures are calculated according to the following equations, and then the flow of control proceeds to step 1370:

$$DPga = Pga(n) - Pga(n-n1)$$

$$DPgl = Pgl(n) - Pgl(n-n1)$$

In step 1370, denoting Vo to be the lower limit vehicle speed detectable by the vehicle speed sensor, it is judged whether or not the vehicle speed V is lower than Vo for a predetermined period, and when the answer is "yest", the flow of control proceeds to step 1380, whereas when the answer is "no", the flow of control proceeds to step 1400.

In step 1380, it is judged whether or not the throttle switch TLSW is off, i.e. whether of nor the vehicle is not accelerated, and when it is judge that the throttle switch is on, the flow of control proceeds to step 1400, whereas when it is judged that the throttle switch is off, the flow of control proceeds to step 1390.

Figure 33:
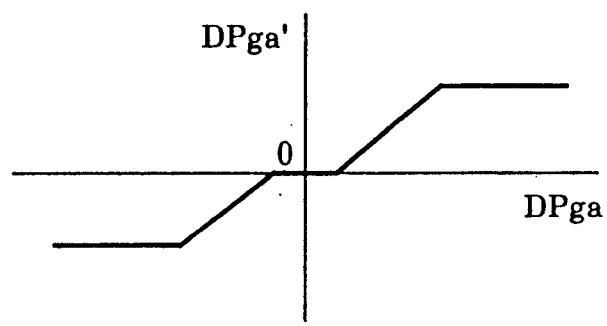
FIGS. 33 through 38 are graphs showing maps used for the modifications of DPga and Dpgl according to the flowcharts shown in FIGS. 32A through 32C.
Figure 34:
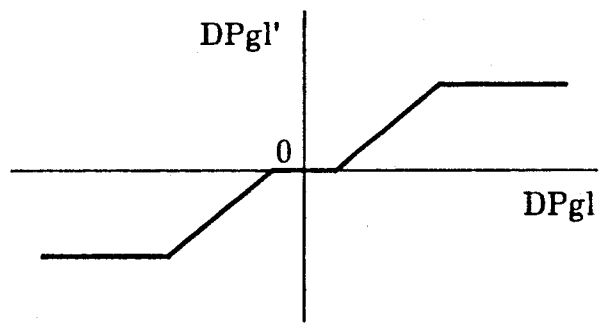

In step 1390, the calculations for the modifications of the differentiations by time of the compensation amount of pressure DPga and DPgl are carried out based upon maps such as the graphs of FIGS. 33 and 34. The maps of FIGS. 33 and 34 are for use in the modification of the differentiations by time of the compensation amount of pressure DPga and DPgl when the vehicle is substantially stopped. As shown in these maps, the values of DPga and DPgl are respectively modified to remain substantially zero when the actual values thereof are very small, then to be increased substantially proportionally along with an increase of the actual values thereof until the actual values thereof reach certain threshold values predetermined therefor, and then to remain substantially constant when the actual values thereof further increase. It will be noted that the lines in the first and third opposite quadrants of the graphs are symmetrical to one another, indicating that the suspension control is performed in a symmetrical manner around a neutral point of displacement of the actuator at each wheel. Then the flow of control proceeds to step 1430.

In step 1400, it is judged whether or not the road is rough, and when it is judged that the road is not rough, the flow of control proceeds to step 1420, whereas when it is judged that the road is rough, the flow of control proceeds to step 1410.

Figure 35:
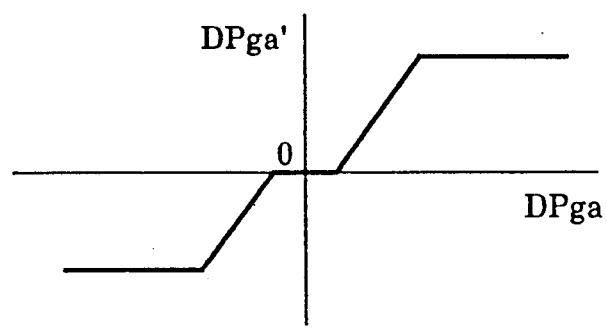
Figure 36:
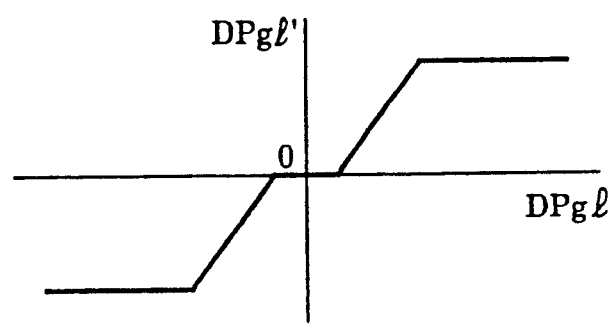

In step 1410, based upon maps such as the graphs of FIGS. 35 and 36, calculations for the modifications of the differentiations by time of the compensation amounts of pressure DPga and DPgl are carried out. The maps of FIGS. 35 and 36 are for use in the modification of the differentiations by time of the modes DPga and DPgl when the vehicle is running on a rough road. As shown in these maps, the values of DPga and DPgl are respectively modified to remain substantially zero when the actual values thereof are very small, then to be increased substantially proportionally along with increase of the actual values thereof until the actual values thereof reach certain threshold values predetermined therefor, and to remain constant in spite of further increase of the actual values thereof. Similarly, again, the lines in the first and third opposite quadrants of the graphs are symmetrical to one another, indicating that the suspension control is performed in a symmetrical manner around a neutral displacement of the actuator at each wheel. Then the flow of control proceeds to step 1430.

Figure 37:
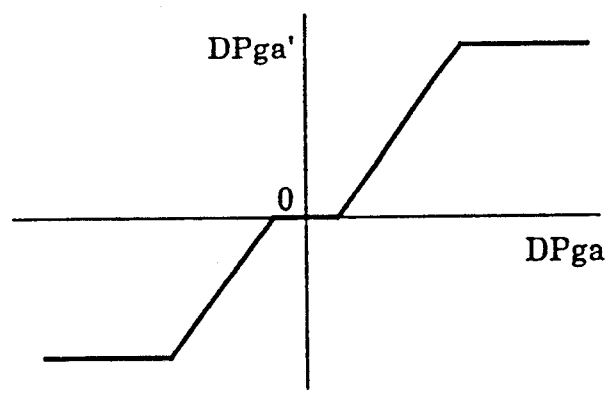
Figure 38:
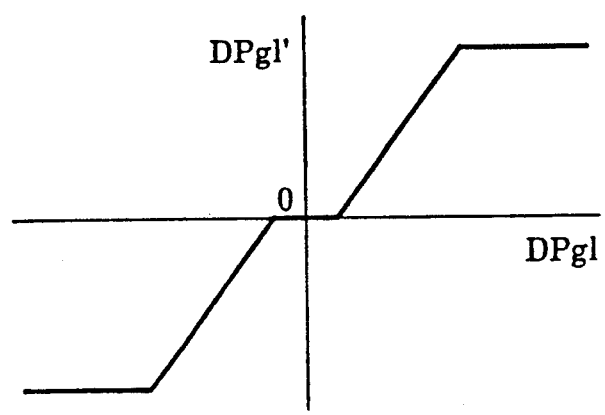

In step 1420, based upon maps such as the graphs of FIGS. 37 and 38 calculations for modifications of the differentiations of the compensation amounts of pressure DPga and DPgl are carried out. The maps of FIGS. 37 and 38 are for use in the modification of the differentiations by time of the compensation amounts, DPga and DPgl when the vehicle is running on a relatively road. As shown in these maps, the values of DPga and DPgl are respectively modified to remain substantially zero when the actual values thereof are very small, then to be increased substantially proportionally along with increase of the actual values thereof until the actual values thereof reach certain threshold values predetermined therefor, and then to remain constant in spite of any further increase of the actual value thereof beyond said threshold value. Similarly, the lines in the first and third opposite quadrants of the graphs are symmetrical to one another, indicating that the suspension control is performed in a symmetrical manner around a neutral point of displacement of the actuator at each wheel. Then the flow of control proceeds to step 1430.

In step 1430, calculations for PD compensations for the acceleration feedback control are carried out with respect to pitch (Cgp) and roll (Cgr) according to the following equations, and thereafter the flow of control proceeds to step 1440:

$$Cgp = Kpgp \cdot Pga + Kdgp \cdot DPga'$$

$$Cgr = Kpgr \cdot Pgl + Kdgr \cdot DPgl'$$

In step 1440, denoting the steering angle read in in step 30 at the one cycle preceding cycle in the flowchart of FIG. 3 as As', steering angle velocity RAs is calculated according to the following equation:

$$RAs = As - As'$$

Then, based upon a map such as the graph of FIG. 24, the steering angle velocity RAs calculated above, and the vehicle speed V, a forecast change rate Rgl of the lateral acceleration Gl is calculated, and then the flow of control process to step 1450:

In step 1450, calculations for reversal conversion of the acceleration modes are carried out according to the following equations, and then the flow of control proceeds to step 1460:

$$Pg1 = Kg1/4 \cdot (-Cgp + K2f \cdot Cgr + K1f \cdot RGl)$$

$$Pg2 = Kg2/4 \cdot (-Cgp - K2f \cdot Cgr - K1f \cdot RGl)$$

$$Pg3 = Kg3/4 \cdot (Cgp + K2r \cdot Cgr + K1r \cdot RGl)$$

$$Pg4 = Kg4/4 \cdot (Cgp - K2r \cdot Cgr - K1r \cdot RGl)$$

In the above equations Kg1, Kg2, Kg3 and Kg4 are proportional constants, and K1f, K1r, K2f and K2r are constants for distributing gains between the front and rear vehicle wheels.

In step 1460, based upon the pressures Pbi stored in the RAM 208 in step 150 and the results of calculations in steps 1340 and 1450, target pressures Pui for the pressure control means are calculated according to the following equation, and thereafter the flow of control proceeds to step 1470:

$$Pui = Pxi + Pgi + Pbi (i = 1, 2, 3 \text{ and } 4)$$

Figure 6C:
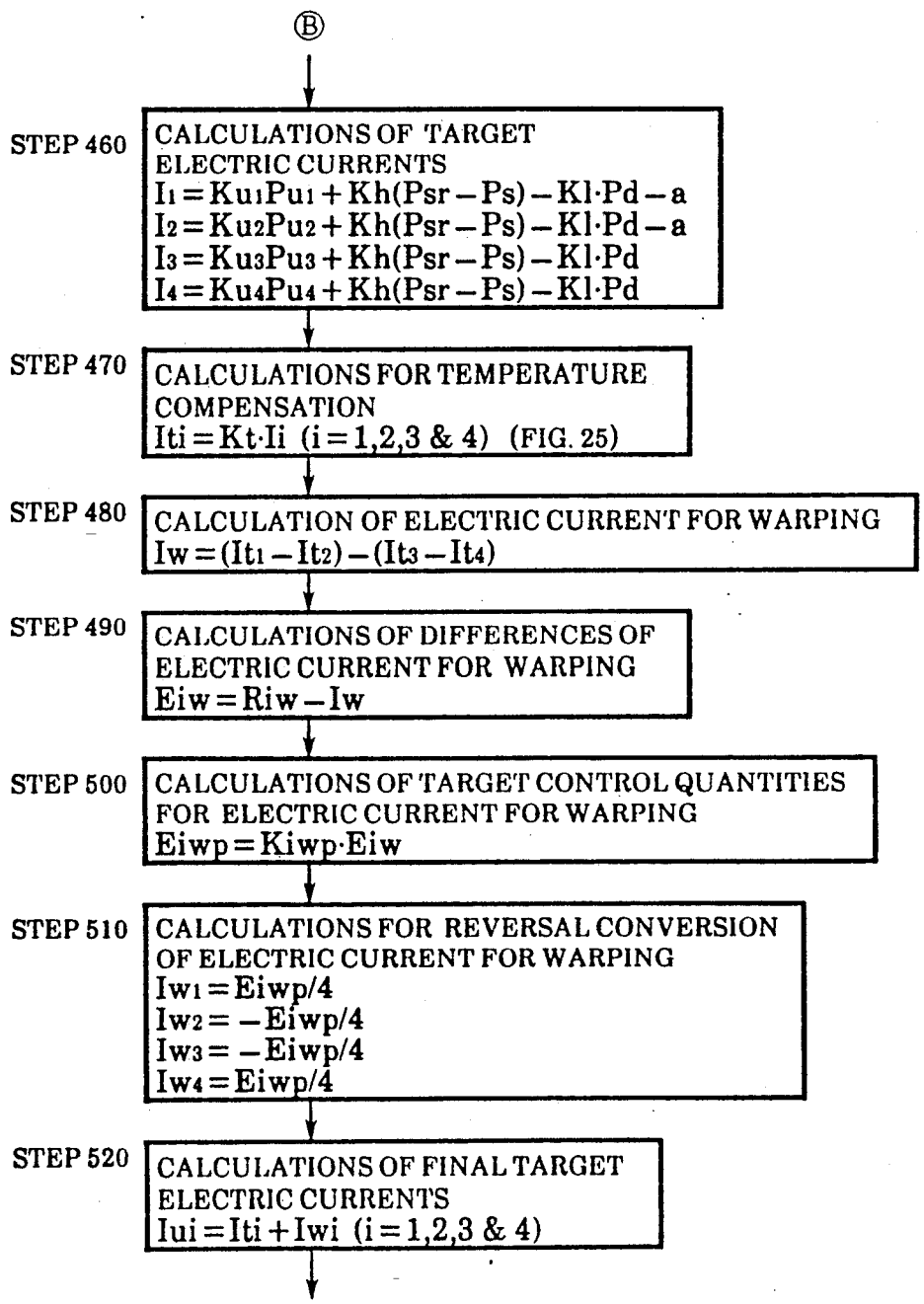
Figure 32C:
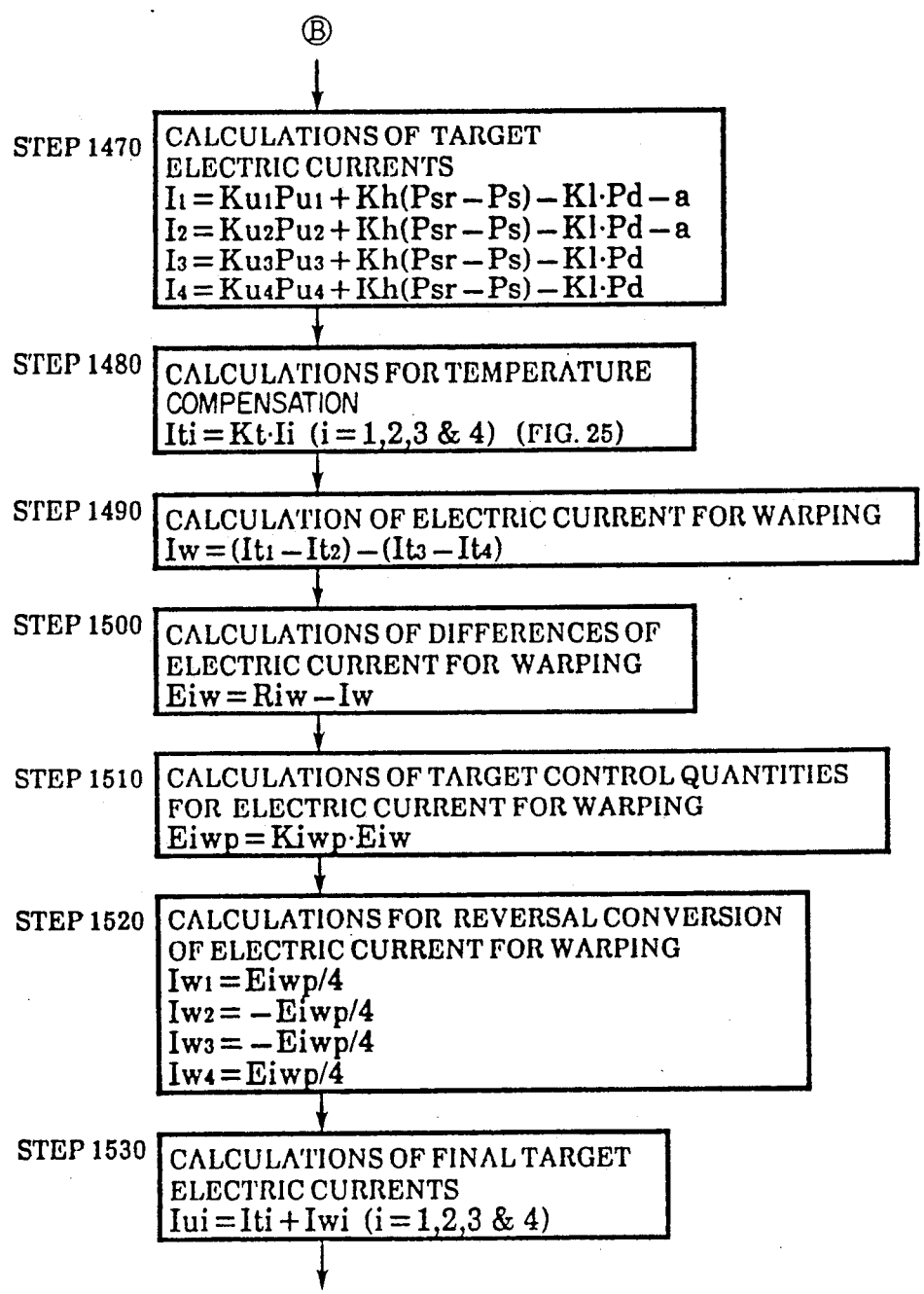

Subsequent steps 1470–1530 shown in FIG. 32C are the same as steps 460–520 shown in FIG. 6C. Therefore, further descriptions about these steps will be omitted to avoid redundancy of the description.

Thus, according to this fourth embodiment, when the vehicle is stopped in steps 1370 and 1380 the answer is "yes", and then in step 1390, when the values of the differentiations by time of the compensation amounts for the pressure, DPga and DPgl, are large, those values are substantially decreased to DPga' and DPgl' according to the maps of the graphs in FIGS. 33 and 34, respectively, so that the control amounts for the pressures in the actuators are correspondingly decreased. Therefore, it is avoided that the posture of the vehicle body is changed due to violent opening or closing of a door, getting on or off of passengers or the like.

When the vehicle is running on a rough road, wherein the judgement in step 1370 is "no" and the judgement in step 1400 is "yes", then in step 1410 the differentiation values by time of the compensation amounts for the pressure, DPga and DPgl, are modified to be smaller according to such maps as the graphs of FIGS. 35 and 36, and therefore, the control amounts for the pressures in the fluid chambers of the actuators are decreased. Thus, the comfortableness in driving on the rough road is improved.

In normal operation of the vehicle, in steps 1370 and 1400 the answer to the judgement is "no", and therefore in step 1420 the differentiation values of the compensation amounts for the pressure are decreased only when they are very high according to such maps as the graphs of FIGS. 37 and 38. Therefore, a change of the posture of the vehicle body in turning or acceleration or deceleration, or a shock due to a light bumping of a foreign material against the body is effectively suppressed.

Although in the above described embodiments the judgement with regard to whether or not the vehicle is stopped is made according to the vehicle speed, when the vehicle has an automatic transmission, information such as whether or not the shift lever detected by a shift position sensor is at the P or N position or a parking brake detected by a parking brake switch is on may be time sequentially judged so that, when answers to these judgements are "no", it is judged that the vehicle is stopped.

Although the invention has been described in the above with respect the particular embodiments thereof, it will be apparent to one ordinary skill in the art that various modifications are possible without departing from the scope of the present invention.

We claim:

1. A fluid pressure type active suspension in a vehicle: comprising, a fluid pressure type actuator having a fluid chamber and supporting a vehicle body for a wheel so as to be able to vary a vehicle height of said vehicle body relative to said wheel in accordance with a fluid pressure supplied in said fluid chamber, and a pressure control means for controlling the fluid pressure supplied in said fluid chamber of said actuator according to certain control parameters including at least a rate of change of the vehicle height or an acceleration of the vehicle body, wherein said control means modifies an actual value of said rate of change of the vehicle height or said acceleration of the vehicle body for use in said control of the fluid pressure supplied in said fluid chamber of said actuator, said modification including decreasing a value of said rate of change of the vehicle height or said acceleration of the vehicle body for use in said control of fluid pressure supplied in said fluid chamber of said actuator to be less than the actual value thereof when said rate of change of the vehicle height or said acceleration of the vehicle body is greater than a threshold value therefor.

2. A fluid pressure type active suspension according to claim 1, wherein the value for use in the suspension control of said rate of change of the vehicle height is modified to limit a maximum value thereof.

3. A fluid pressure type active suspension according to claim 1, wherein the value for use in the suspension control of said rate of change of the vehicle height is modified to remain substantially zero when the actual value thereof is very small, then to be increased substantially proportionally along with an increase of the actual value thereof until the actual value thereof reaches a certain threshold value therefor, and then to remain substantially constant when the actual value thereof further increases beyond said threshold value while the vehicle is substantially stopped.

4. A fluid pressure type active suspension according to claim 1, wherein the value for use in the suspension control of said rate of change of the vehicle height is modified to remain substantially zero when the actual value thereof is very small, then to be increased substantially proportionally along with an increase of the actual value thereof until the actual value thereof reaches a certain threshold value therefor, and then to be decreased along with further increase of the actual value thereof beyond said threshold value while the vehicle is running.

5. A fluid pressure type active suspension according to claim 1, wherein the value for use in the suspension control of said rate of change of the vehicle height is modified to remain substantially zero when the actual value thereof is very small, then to be increased substantially proportionally along with an increase of the actual value thereof until the actual value thereof reaches a certain threshold value therefor, then to be decreased so far as to be opposite to the actual value thereof in sign along with a further increase of the actual value thereof beyond said threshold value until the actual value thereof reaches a certain higher further value therefor, and then to be again increased to be substantially proportionally to any further increase of the actual value thereof beyond said further threshold value while the vehicle is running on a rough road.

6. A fluid pressure type active suspension according to claim 1, wherein the value for use in the suspension control of said acceleration of the vehicle body is modified to remain substantially zero when the actual value thereof is very small, then to be increased substantially proportionally along with an increase of the actual value thereof until the actual value thereof reaches a certain threshold value therefor, and then to remain substantially constant when the actual value thereof further increases beyond said threshold value.

7. A fluid pressure type active suspension according to claim 6, wherein said substantially constant value is greater when the vehicle is running on a rough road than when the vehicle is stopped.

8. A fluid pressure type active suspension according to claim 6, wherein said substantially constant value is greater when the vehicle is running on a relatively smooth road than when the vehicle is running on a rough road.

* * * * *